(12) United States Patent
Ishihara

(10) Patent No.: US 9,395,537 B2
(45) Date of Patent: Jul. 19, 2016

(54) OPTICAL SCANNING APPARATUS

(71) Applicant: CANON KABUSHIKI KAISHA, Tokyo (JP)

(72) Inventor: Kazuyuki Ishihara, Nagoya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/712,183

(22) Filed: May 14, 2015

(65) Prior Publication Data

US 2015/0338647 A1    Nov. 26, 2015

(30) Foreign Application Priority Data

May 21, 2014  (JP) ................................. 2014-105309

(51) Int. Cl.
| | | |
|---|---|---|
| G02B 26/12 | (2006.01) | |
| G03G 15/043 | (2006.01) | |
| G02B 3/06 | (2006.01) | |
| B41J 2/47 | (2006.01) | |
| G02B 13/00 | (2006.01) | |
| G02B 13/18 | (2006.01) | |
| G02B 26/10 | (2006.01) | |
| H04N 1/113 | (2006.01) | |

(52) U.S. Cl.
CPC ................. *G02B 26/125* (2013.01); *B41J 2/47* (2013.01); *G02B 3/06* (2013.01); *G02B 13/00* (2013.01); *G02B 13/18* (2013.01); *G02B 26/10* (2013.01); *G02B 26/123* (2013.01); *G02B 26/124* (2013.01); *G03G 15/043* (2013.01); *H04N 1/113* (2013.01)

(58) Field of Classification Search
CPC .......... G02B 26/10; G02B 13/00; G02B 3/06; G02B 26/125; G02B 26/124; B41J 2/47; G03G 15/043
See application file for complete search history.

(56) References Cited

FOREIGN PATENT DOCUMENTS

| | | | |
|---|---|---|---|
| JP | 2004-294713 A | | 10/2004 |
| JP | 2008-015139 A | | 1/2008 |
| JP | 2008015139 A | * | 1/2008 |

* cited by examiner

*Primary Examiner* — Sarah Al Hashimi
(74) *Attorney, Agent, or Firm* — Carter, DeLuca, Farrell & Schmidt, LLP

(57) ABSTRACT

The optical scanning apparatus according to the present invention includes a deflection unit that deflects a light flux, a plurality of incident optical systems that cause light fluxes to enter the deflection unit at different incident angles in a sub-scanning cross section, and an imaging optical system that guides a plurality of light fluxes deflected by the deflection unit onto a scanned surface. The imaging optical system has a first optical functional portion and a second optical functional portion arranged in a sub-scanning direction and connected to each other by a connecting portion. In a plane including the connecting portion, at least incident surfaces or exit surfaces of the first and second optical functional portions overlap with each other at least at one point.

20 Claims, 14 Drawing Sheets

POSITION IN MAIN SCANNING DIRECTION
ON SECOND IMAGING LENS 5b2

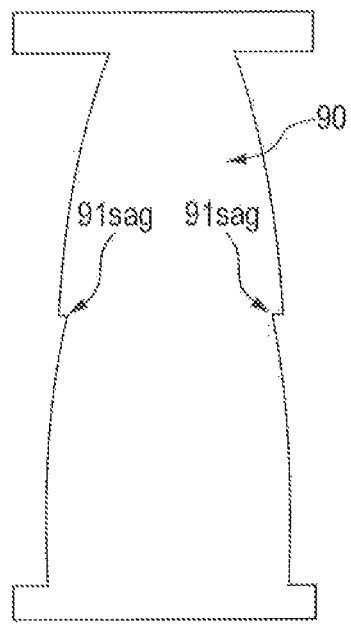
FIG. 13A
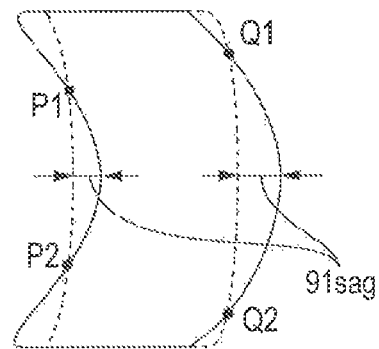
FIG. 13B
FIG. 14
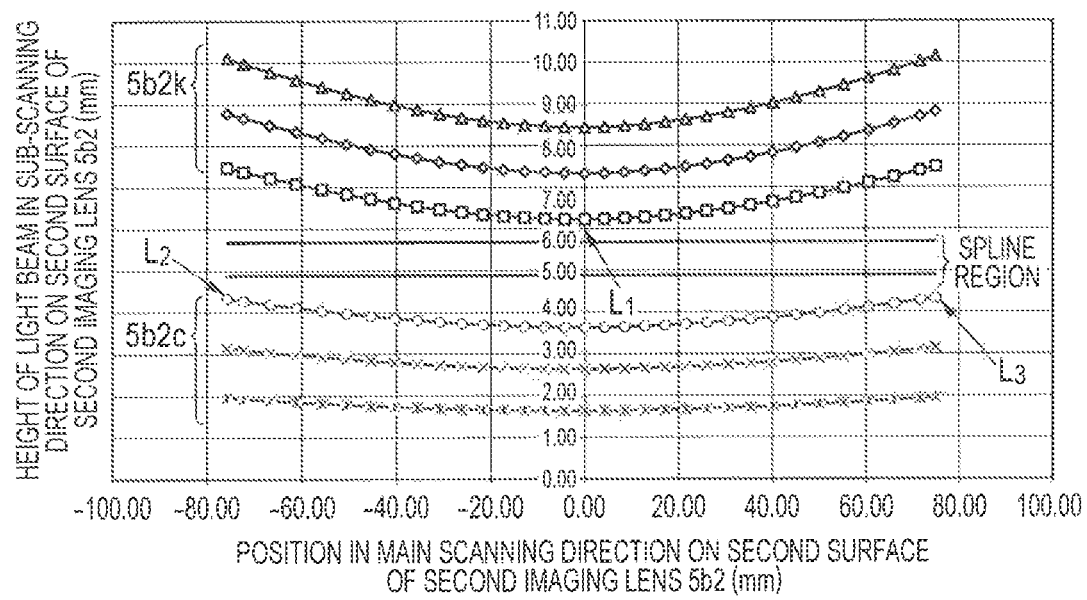

OPTICAL SCANNING APPARATUS

BACKGROUND OF THE INVENTION

1. Field of the Invention

The present invention relates to an optical scanning apparatus that is suitable for an image forming apparatus, such as a laser beam printer (LBP), a digital copying machine and a multi-function printer (MFP).

2. Description of the Related Art

To reduce the number of components, simplify the configuration and reduce the size, conventional optical scanning apparatuses include an optical system in which light is incident on a polygon mirror in a direction oblique to a sub-scanning direction (referred to as an oblique incident optical system).

To further reduce the size and the cost, various optical scanning apparatuses have been proposed in which imaging lenses close to photosensitive drums, which would typically be provided separately for the respective photosensitive drums, are replaced with a common imaging lens is shared among the photosensitive drums.

More specifically, a common imaging lens is shared among a plurality of photosensitive drums by providing a plurality of optical functional portions arranged in the sub-scanning direction, each optical functional portion having an incident optical surface and an exit optical surface for a light flux directed to a corresponding photosensitive drum.

Japanese Patent Application Laid-Open No. 2004-294713 and Japanese Patent Application Laid-Open No. 2008-15139 disclose optical scanning apparatuses that comprise an imaging lens including a plurality of optical functional portions arranged in the sub-scanning direction. However, the conventional techniques disclosed in Japanese Patent Application Laid-Open No. 2004-294713 and Japanese Patent Application Laid-Open No. 2008-15139 have the problems described below.

In Japanese Patent Application Laid-Open No. 2004-294713, it is described that there is a discontinuous part between optical functional portions arranged side by side in the sub-scanning direction in a multi-layer toric lens used as an imaging lens. It is also described that light fluxes having sub-scanning oblique incident angles whose signs are the same but whose absolute values are different are incident on the multi-layer toric lens. If optical functional portions designed for the light fluxes having sub-scanning oblique incident angles whose signs are the same but whose absolute values are different are arranged side by side in the sub-scanning direction in an imaging lens, a sag in the optical axis direction occurs at the discontinuous parts between the optical functional portions. Therefore, the transferability of shapes in molding deteriorates at the discontinuous parts, and as a result, the optical capabilities of the imaging lens can deteriorate. To avoid this, the incident surfaces and/or exit surfaces of the optical functional portions can be smoothly connected to each other by a spline curve surface so as to eliminate the sag in the optical axis direction. In that case, however, the optically effective area of the optical functional portions decreases, and as a result, required imaging properties may not be able to be achieved if the light fluxes are incident on the multi-layer toric lens at positions displaced in the sub-scanning direction due to a tolerance and the like. To avoid this, the sag in the optical axis direction at the discontinuous parts between the optical functional portions needs to be reduced.

The optical scanning apparatus disclosed in Japanese Patent Application Laid-Open No. 2008-15139 uses a multi-layer toric lens including optical functional portions arranged side by side in the sub-scanning direction, the optical functional portions being designed for light fluxes having sub-scanning oblique incident angles whose absolute values are the same but whose signs are different. In the disclosed optical scanning apparatus, the incident surfaces and/or exit surfaces of the optical functional portions are connected to each other by a spline curve surface at the boundaries therebetween. However, the optical scanning apparatus according to Japanese Patent Application Laid-Open No. 2008-15139 does not take into consideration that light fluxes having sub-scanning oblique incident angles whose absolute values are different but whose signs are the same are each close to a boundary between optical functional portions in the sub-scanning direction. Therefore, with the optical scanning apparatus according to Japanese Patent Application Laid-Open No. 2008-15139, light fluxes having sub-scanning oblique incident angles whose absolute values are different but whose signs are the same can be displaced in the sub-scanning direction due to a tolerance and the like and therefore pass through the spline curve surface, thereby causing deterioration of the optical capabilities.

The present invention provides an optical scanning apparatus that comprises an imaging lens that adopts an oblique incident optical system and includes a plurality of optical functional portions arranged side by side in a sub-scanning direction and can provide an image of high quality without causing deterioration of optical capabilities by reducing a sag in an optical axis direction at a connecting portion between optical functional portions.

SUMMARY OF THE INVENTION

An optical scanning apparatus according to the present invention comprises a deflection unit that deflects a light flux, a plurality of incident optical systems that cause light fluxes to enter the deflection unit at different incident angles in a sub-scanning cross section, and an imaging optical system that guides a plurality of light fluxes deflected by the deflection unit onto a scanned surface, the imaging optical system has a first optical functional portion and a second optical functional portion arranged in a sub-scanning direction and connected to each other by a connecting portion, and in a plane including the connecting portion, at least incident surfaces or exit surfaces of the first and second optical functional portions overlap with each other at least at one point.

Further features of the present invention will become apparent from the following description of exemplary embodiments with reference to the attached drawings.

BRIEF DESCRIPTION OF THE DRAWINGS

FIGS. 13A and 13B are diagrams showing a multi-layer toric lens 90 used for the second imaging lenses —5b1 and 5b2 of the optical scanning apparatus 100 according to the first embodiment, to which the design according to the present invention is applied.

FIG. 14 is a graph showing the dependency on the position in the main scanning direction of the height of the principal ray and the marginal ray of the light flux emitted from the incident optical systems LA3 and LA4 that passes through the second surface of each of the optical functional portions 5b2c and 5b2k of the second imaging lens 5b2 according to the second embodiment, which corresponds to the diagram of FIG. 7B.

DESCRIPTION OF THE EMBODIMENTS

Preferred embodiments of the present invention will now be described in detail in accordance with the accompanying drawings.

In the following, an optical scanning apparatus according to the present invention will be described with reference to the drawings. To facilitate understanding of the present invention, the drawings described below are not necessarily to scale.

In the following description, a main scanning direction is a direction in which a light flux is deflected and scanned by a rotary polygon mirror. A sub-scanning direction is a direction perpendicular to an optical axis direction and the main scanning direction. A main scanning cross section is a plane perpendicular to the sub-scanning direction. A sub-scanning cross section is a plane perpendicular to the main scanning direction.

The optical scanning apparatus according to the present invention comprises incident optical systems LA1, LA2, LA3 and LA4 (sometimes referred to collectively as LA, hereinafter), a polygon mirror 4, which is a rotary polygon mirror, an imaging optical system LB and a synchronization detecting optical system (BD optical system) LC.

The incident optical system LA converts a light flux emitted from a light source into a desired shape, and the polygon mirror 4 makes the light flux converted into the desired shape by the incident optical system LA rotate to be deflected and scanned. The imaging optical system LB collects the light flux deflected and reflected by the polygon mirror 4 onto a scanned surface 8, and the BD optical system LC determines the time to start irradiation of the scanned surface 8 with the light flux.

Figure 1:
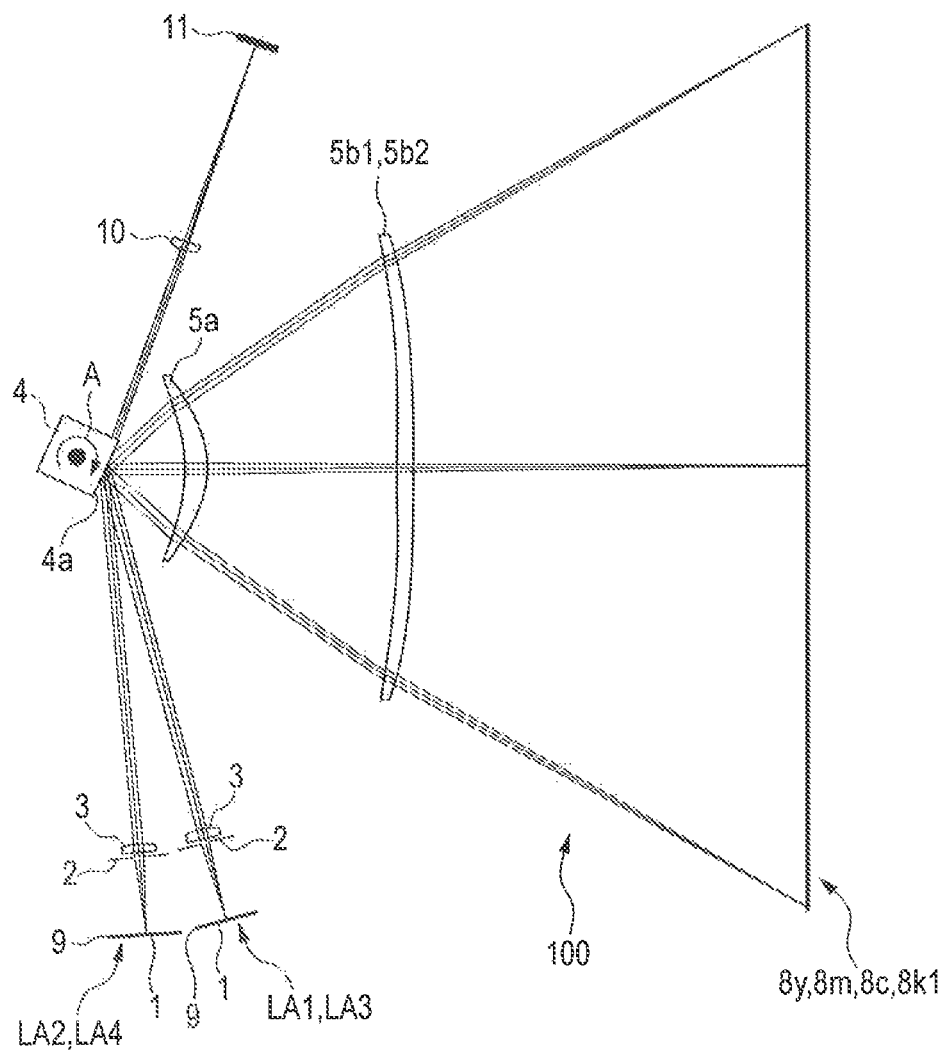
FIG. 1 is a diagram showing a main scanning cross section of an optical scanning apparatus 100 according to a first embodiment of the present invention.
Figure 2:
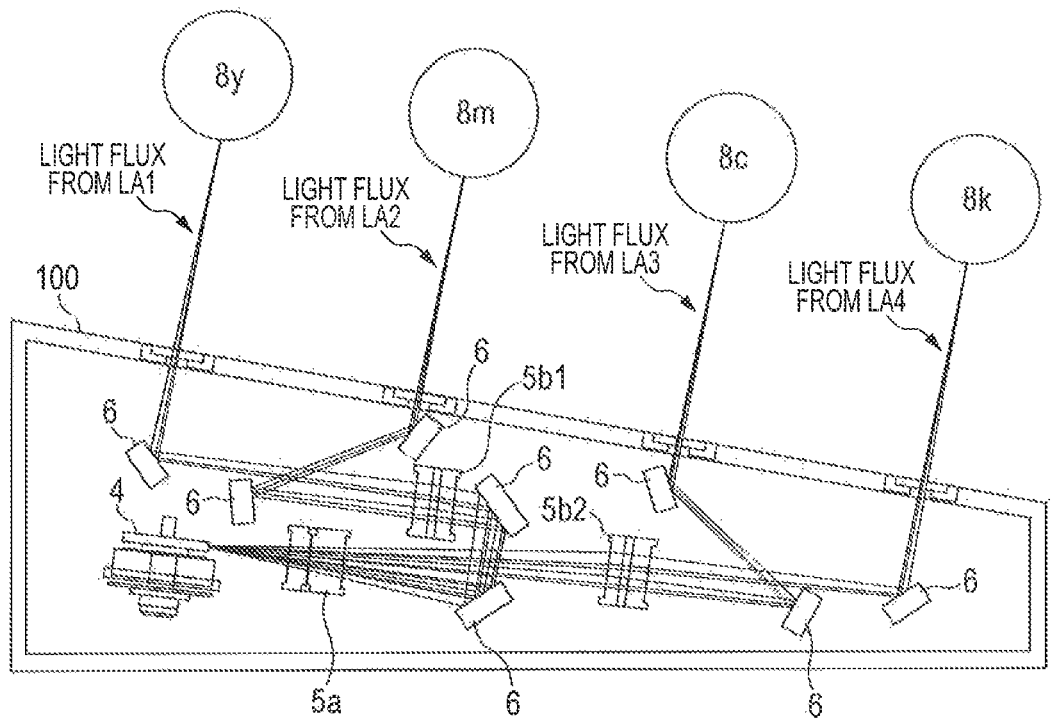
FIG. 2 is a diagram showing a sub-scanning cross section of an imaging optical system LB of the optical scanning apparatus 100 according to the first embodiment.
Figure 3A:
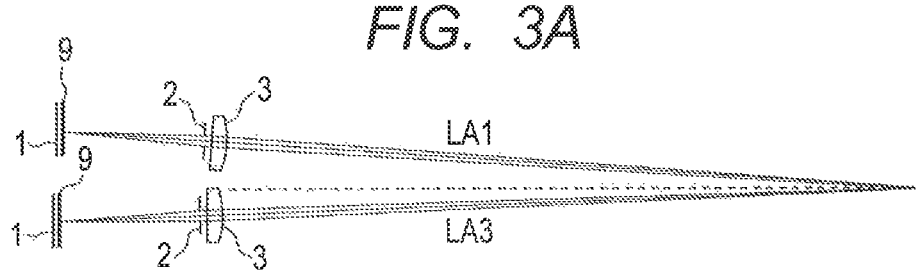
FIG. 3A is a diagram showing a sub-scanning cross section of incident optical systems LA1 and LA3 of the optical scanning apparatus 100 according to the first embodiment.
Figure 3B:
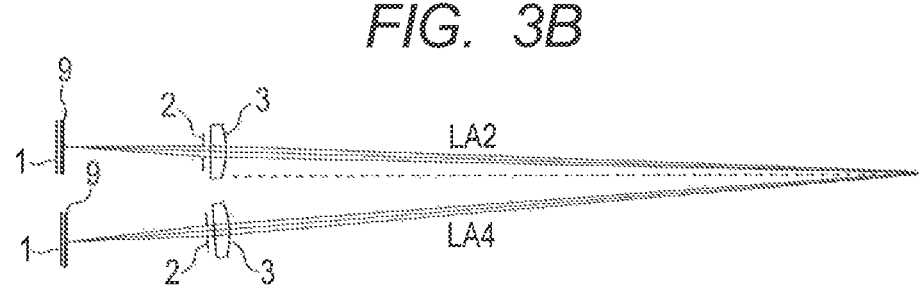
FIG. 3B is a diagram showing a sub-scanning cross section of incident optical systems LA2 and LA4 of the optical scanning apparatus 100 according to the first embodiment.
Figure 4:
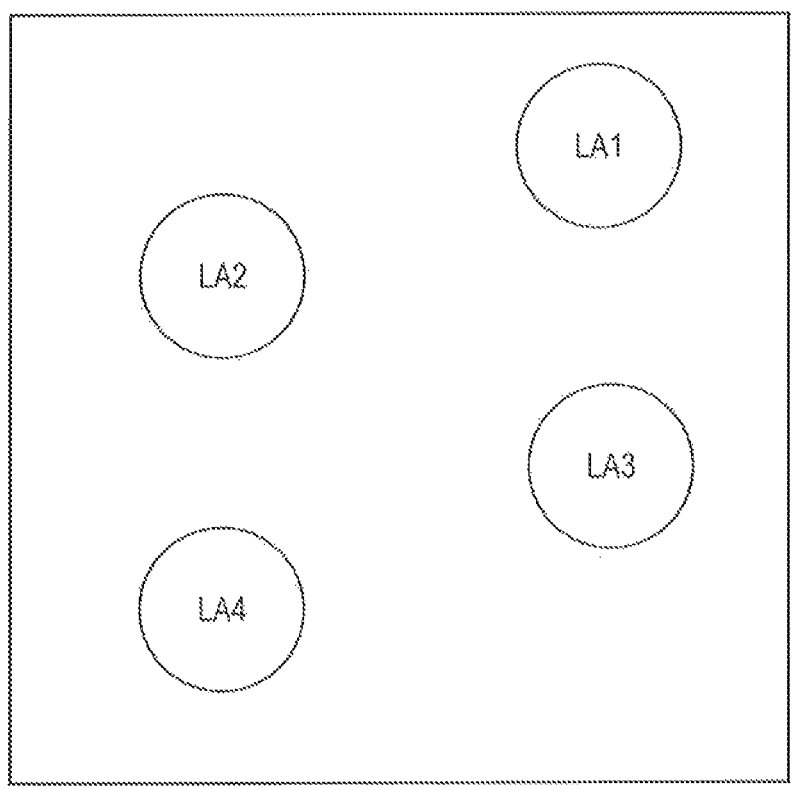
FIG. 4 is a diagram showing the incident optical systems LA1, LA2, LA3 and LA4 of the optical scanning apparatus 100 according to the first embodiment viewed from the side of a light source 1.
Figure 5:
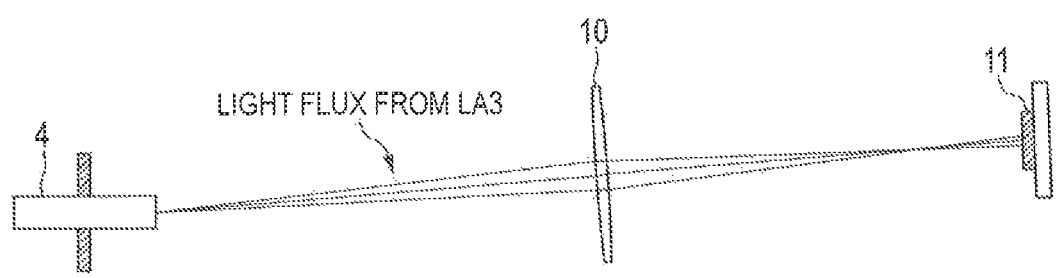
FIG. 5 is a diagram showing a sub-scanning cross section of a BD optical system LC of the optical scanning apparatus 100 according to the first embodiment.

FIG. 1 is a diagram showing a main scanning cross section of an optical scanning apparatus 100 according to a first embodiment of the present invention. FIG. 2 is a diagram showing a sub-scanning cross section of the imaging optical system LB of the optical scanning apparatus 100 according to the first embodiment. FIG. 3A is a diagram showing sub-scanning cross sections of incident optical systems LA1 and LA3 of the optical scanning apparatus 100 according to the first embodiment, and FIG. 3B is a diagram showing sub-scanning cross sections of incident optical systems LA2 and LA4 of the optical scanning apparatus 100 according to the first embodiment. FIG. 4 is a diagram showing the incident optical systems LA1, LA2, LA3 and LA4 of the optical scanning apparatus 100 according to the first embodiment viewed from the side of a light source 1. FIG. 5 is a diagram showing a sub-scanning cross section of the BD optical system LC of the optical scanning apparatus 100 according to the first embodiment.

Next, a configuration of each optical system will be described with reference to FIGS. 1 to 5.

The incident optical systems LA1, LA2, LA3 and LA4 each comprises the light source 1, a cover glass 9, an aperture stop 2 and an anamorphic collimator lens 3.

The light source 1 is a semiconductor laser that has an emission point.

The cover glass 9 is disposed adjacent to the light source 1 to protect the light source 1 from dust.

The aperture stop 2 is to form the light flux emitted from the light source 1 into a desired shape and is a rectangular stop in this embodiment. According to the present invention, however, the aperture stop 2 may be of any other shape, such as an elliptical shape, as required.

The anamorphic collimator lens 3 is to change the degree of convergence of the light flux emitted from the light source 1 and formed into a desired shape by the aperture stop 2, and converts the light flux into a light flux that is substantially parallel rays in the main scanning direction and is collected at the vicinity of a deflecting surface 4a of the polygon mirror 4 in the sub-scanning direction. The "substantially parallel rays" include weakly diverging rays, weakly converging rays and parallel rays. The anamorphic collimator lens 3 may be replaced with a series arrangement of a collimator lens that converts the light flux emitted from the light source 1 into substantially parallel rays and a cylindrical lens that collects the parallel rays at the vicinity of the deflecting surface 4a of the polygon mirror 4 only in the sub-scanning direction.

As can be seen from FIG. 1, optical axes of the incident optical systems LA1 and LA3 lie in the same plane that is parallel with a rotation axis of the polygon mirror 4. Light fluxes from the incident optical systems LA1 and LA3 are incident on the deflecting surface 4a of the polygon mirror 4 in such a manner that the light fluxes are incident on the surface at the same incident angle in the cross section (main scanning cross section) perpendicular to the rotation axis of the polygon mirror 4 (that is, the projections of the light fluxes onto the cross section are incident on the surface at the same incident angle). Optical axes of the incident optical systems LA2 and LA4 lie in the same plane that is parallel with the rotation axis of the polygon mirror 4. Light fluxes from the incident optical systems LA2 and LA4 are incident on the deflecting surface 4a of the polygon mirror 4 in such a manner that the light fluxes are incident on the surface at the same incident angle in the cross section (main scanning cross section) perpendicular to the rotation axis of the polygon mirror 4 (that is, the projections of the light fluxes onto the cross section are incident on the surface at the same incident angle).

As can be seen from FIGS. 3A, 3B and 4, the light fluxes from the incident optical systems LA1, LA2, LA3 and LA4 are incident on the deflecting surface 4a of the polygon mirror 4 at different incident angles in the sub-scanning cross section (that is, the projections of the light fluxes onto the cross section are incident on the surface at different incident angles). More specifically, the incident angles of the light axes of the incident optical systems LA1 and LA2 with respect to the deflecting surface 4a in the sub-scanning cross section are of the same sign, and the incident angles of the light axes of the incident optical systems LA3 and LA4 with respect to the deflecting surface 4a in the sub-scanning cross section are of the same sign, which is opposite to the sign of the incident angles of the light axes of the incident optical systems LA1 and LA2. The difference in incident angle onto the deflecting surface 4a in the sub-scanning cross section allows separation of light beams and guide of the light beams to each scanned surface by a light beam separation unit described later.

The polygon mirror 4 is a rotary polygon mirror that serves as a deflection unit. The polygon mirror 4 has a plurality of deflecting surfaces 4a and rotates in the direction indicated by the arrow A at a constant speed. According to this embodiment, the polygon mirror 4 is a rectangular four-faced mirror and has four deflecting surfaces 4a. The light flux emitted from the incident optical system LA is deflected and scanned by the rotating polygon mirror 4 and guided to the imaging optical system LB.

The imaging optical system LB comprises a first imaging lens 5a and second imaging lenses 5b1 and 5b2 that collect the light flux deflected and scanned by the polygon mirror 4 at the vicinity of the scanned surface 8. The first imaging lens 5a and the second imaging lenses 5b1 and 5b2 have a positive refracting power in the main scanning cross section and the sub-scanning cross section. However, the magnitude of the refracting power differs between in the main scanning cross section and in the sub-scanning cross section. In the main scanning direction, the first imaging lens 5a and the second imaging lenses 5b1 and 5b2 have fθ characteristics and can collect the light flux deflected and scanned by the polygon mirror 4 at positions at the vicinity of the scanned surface 8 that are proportional to the deflection angle (rotation angle of the deflection unit) in the main scanning direction and at regular intervals in the sub-scanning direction. The imaging optical system LB achieves optical face tangle error correction for the deflecting surface 4a by making the vicinity of the deflecting surface 4a of the polygon mirror 4 and the scanned surface 8 optically conjugate.

According to this embodiment, the scanned surface 8 comprises photosensitive drum surfaces for four colors, yellow (Y), magenta (M), cyan (C) and black (K), which are denoted by 8y, 8m, 8c and 8k, respectively. The light fluxes emitted from the incident optical systems LA1, LA2, LA3 and LA4 are incident on the scanned surfaces 8y, 8m, 8c and 8k, respectively.

The first imaging lens 5a of the imaging optical system LB is a shared imaging lens for all the scanned surfaces 8y, 8m, 8c and 8k. The second imaging lens 5b1 is an imaging lens for the light fluxes directed to the photosensitive drums 8y and 8m, and the second imaging lens 5b2 is an imaging lens for the light fluxes directed to the photosensitive drums 8c and 8k.

A return mirror 6, which serves as the light beam separation unit, appropriately separate and reflect the light flux directed to each scanned surface, thereby guiding the light flux to the scanned surface. In FIG. 1, no return mirror 6 is illustrated.

The BD optical system LC, which serves as the synchronization detecting optical system, comprises a BD lens 10 and a BD sensor 11.

The BD lens 10 is a toric lens that has different refracting powers in the main scanning cross section and the sub-scanning cross section.

The BD sensor 11 comprises a photo diode and has a light receiving surface having a diameter of approximately 1.5 mm.

The light flux deflected and reflected at a desired angle by the deflecting surface 4a of the polygon mirror 4 is incident on the BD lens 10 and thereby converted in such a manner that the light flux is collected in the main scanning direction and dispersed in the sub-scanning direction in the vicinity of the BD sensor 11. Since the light flux is collected in the main scanning direction, synchronization timing (BD signal) for image information can be detected with high precision. Since the light flux is dispersed in the sub-scanning direction, deterioration of the precision of detection due to a dust and the like on the BD sensor 11 can be prevented.

The BD signal is obtained when the light flux reaches a desired position on the BD sensor 11, so that the rotation speed of the polygon mirror 4 and the image write timing on the scanned surface 8 can be controlled. Although the BD signal is obtained by using the light fluxes emitted from the incident optical system LA3 according to this embodiment, the BD signal for image printing may be obtained by using the light fluxes emitted from all the incident optical systems LA1, LA2, LA3 and LA4.

The optical scanning apparatus 100 according to this embodiment is configured as described above. That is, light fluxes modulated in intensity based on image information are emitted by the light sources 1 of the incident optical systems LA1 to LA4, pass through the incident optical systems LA1 to LA4 and then are incident on the same deflecting surface 4a of the polygon mirror 4. The light fluxes from the incident optical systems LA1 to LA4 incident on the deflecting surface 4a of the polygon mirror 4 are deflected and scanned by the polygon mirror 4 and collected at a desired position on the scanned surface 8 by the imaging optical system LB, thereby recording the image information.

With the optical scanning apparatus 100 according to this embodiment, the incident optical systems LA1 to LA4 are disposed in the sub-scanning direction in such a manner that the optical axes are at different angles with respect to the main scanning cross section. Furthermore, since the light fluxes emitted from the incident optical systems LA1 to LA4 are incident on, and deflected and scanned by, the same deflecting surface 4a, optical elements can be shared, and the required space and cost can be reduced.

Table 1 shows primary settings of each optical member of the optical scanning apparatus 100 according to this embodiment.

TABLE 1

| | | |
|---|---|---|
| Angle of optical axis of imaging optical system LB with respect to incident optical system LA1 in main scanning cross section | $\phi 1$(deg) | 75 |
| Angle of optical axis of imaging optical system LB with respect to incident optical system LA2 in main scanning cross section | $\phi 2$(deg) | 85 |
| Angle of optical axis of imaging optical system LB with respect to incident optical system LA3 in main scanning cross section | $\phi 3$(deg) | 75 |
| Angle of optical axis of imaging optical system LB with respect to incident optical system LA4 in main scanning cross section | $\phi 4$(deg) | 85 |
| Oblique incident angle of incident optical system LA1 in sub-scanning direction | $\alpha 1$(deg) | 4.2 |
| Oblique incident angle of incident optical system LA2 in sub-scanning direction | $\alpha 2$(deg) | 1.5 |
| Oblique incident angle of incident optical system LA3 in sub-scanning direction | $\alpha 3$(deg) | −1.5 |
| Oblique incident angle of incident optical system LA4 in sub-scanning direction | $\alpha 4$(deg) | −4.2 |
| Oblique incident angle of optical axis of BD optical system LC in sub-scanning direction | $\alpha BD$(deg) | 1.5 |
| Angle of optical axis of imaging optical system LB with respect to BD optical system LC in main scanning direction | $\phi BD$(deg) | 70 |
| f$\theta$ coefficient | f(mm/rad) | 210 |
| Maximum image height | Ymax(mm) | ±156 |
| Maximum scanning field angle | $\theta$(deg) | 42.56 |
| Distance between deflection point and drum surface | Tc(mm) | 247 |
| Number of surfaces of polygon | m | 4 |
| Radius of circumcircle of polygon | R(mm) | 20 |
| Number of rotations of polygon | Rot(round/min) | 37205.00 |
| Aperture diameter in sub-scanning direction (rectangular aperture) | As(mm) | 2.68 |
| Aperture diameter in main scanning (rectangular aperture) | Am(mm) | 3.3 |
| Resolution in sub-scanning direction | dpi | 600 |
| Distance X in optical axis direction of imaging lens of polygon origin from sub-scanning imaging point of LA4 | x(mm) | −5.86 |
| Distance Y in main scanning direction of polygon origin from sub-scanning imaging point of LA4 | Y(mm) | 4.01 |
| Wavelength of laser | $\lambda$(nm) | 790 |

Table 2 shows the radius of curvature R of surfaces of, the distance D between surfaces of, and the index of refraction N of the incident optical systems LA1 to LA4 and the associated imaging optical systems 5a, 5b1 and 5b2 of the optical scanning apparatus 100 according to this embodiment.

TABLE 2

| | Surface number | R | D | N |
|---|---|---|---|---|
| R, D and N for incident optical system LA1 | | | | |
| Emission point 1 of semiconductor laser | 1 | — | 0.500 | 1.000 |
| Laser cover 15 | 2 | — | 0.250 | 1.511 |
| | 3 | — | 27.450 | 1.000 |
| Stop 2 | | — | 1.200 | 1.000 |
| Anamorphic collimator lens 3 | 4 | See Table 4 | 3.000 | 1.524 |
| | 5 | See Table 4 | 133.600 | 1.000 |

TABLE 2-continued

|  | Surface number | R | D | N |
|---|---|---|---|---|
| Deflecting surface 4a of polygon mirror 4 | 6 | — | 28.000 | 1.000 |
| Imaging lens 5a | 7 | See Table 5 | 8.000 | 1.524 |
|  | 8 | See Table 5 | 67.000 | 1.000 |
| Imaging lens 5b1y | 9 | See Table 5 | 5.000 | 1.524 |
|  | 10 | See Table 5 | 139.000 | 1.000 |
| R, D and N for incident optical system LA2 | | | | |
| Emission point 1 of semiconductor laser | 1 | — | 0.500 | 1.000 |
| Laser cover 15 | 2 | — | 0.250 | 1.511 |
|  | 3 | — | 27.450 | 1.000 |
| Stop 2 |  | — | 1.200 | 1.000 |
| Anamorphic collimator lens 3 | 4 | See Table 4 | 3.000 | 1.524 |
|  | 5 | See Table 4 | 133.600 | 1.000 |
| Deflecting surface 4a of polygon mirror 4 | 6 | — | 28.000 | 1.000 |
| Imaging lens 5a | 7 | See Table 5 | 8.000 | 1.524 |
|  | 8 | See Table 5 | 66.850 | 1.000 |
| Imaging lens 5b1m | 9 | See Table 5 | 5.450 | 1.524 |
|  | 10 | See Table 5 | 138.700 | 1.000 |
| R, D and N for incident optical system LA3 | | | | |
| Emission point 1 of semiconductor laser | 1 | — | 0.500 | 1.000 |
| Laser cover 15 | 2 | — | 0.250 | 1.511 |
|  | 3 | — | 27.450 | 1.000 |
| Stop 2 |  | — | 1.200 | 1.000 |
| Anamorphic collimator lens 3 | 4 | See Table 4 | 3.000 | 1.524 |
|  | 5 | See Table 4 | 133.600 | 1.000 |
| Deflecting surface 4a of polygon mirror 4 | 6 | — | 28.000 | 1.000 |
| Imaging lens 5a | 7 | See Table 5 | 8.000 | 1.524 |
|  | 8 | See Table 5 | 66.850 | 1.000 |
| Imaging lens 5b2c | 9 | See Table 5 | 5.450 | 1.524 |
|  | 10 | See Table 5 | 138.700 | 1.000 |
| R, D and N for incident optical system LA4 | | | | |
| Emission point 1 of semiconductor laser | 1 | — | 0.500 | 1.000 |
| Laser cover 15 | 2 | — | 0.250 | 1.511 |
|  | 3 | — | 27.450 | 1.000 |
| Stop 2 |  | — | 1.200 | 1.000 |
| Anamorphic collimator lens 3 | 4 | See Table 4 | 3.000 | 1.524 |
|  | 5 | See Table 4 | 133.600 | 1.000 |
| Deflecting surface 4a of polygon mirror 4 | 6 | — | 28.000 | 1.000 |
| Imaging lens 5a | 7 | See Table 5 | 8.000 | 1.524 |
|  | 8 | See Table 5 | 67.000 | 1.000 |
| Imaging lens 5b2k | 9 | See Table 5 | 5.000 | 1.524 |
|  | 10 | See Table 5 | 139.000 | 1.000 |

Table 3 shows R, D and N of the BD optical system LC of the optical scanning apparatus 100 according to this embodiment.

TABLE 3

|  | Surface number | R | D | N |
|---|---|---|---|---|
| BD lens 10 | 7 | See Table 6 | 2.000 | 1.485 |
|  | 8 | See Table 6 | 74.650 | 1.000 |
| BD sensor 11 | 9 | — | 0.000 | 1.000 |

Table 4 shows the radiuses of curvature R and r of the anamorphic collimator lens 3 of each of the incident optical systems LA1 to LA4 of the optical scanning apparatus 100 according to this embodiment in a meridional direction and a sagittal direction and phase functions of a diffraction grating.

TABLE 4

| Anamorphic collimator lens 3 | Meridional R | Sagittal r | Phase function U02 | Phase function U20 |
|---|---|---|---|---|
| Surface 4 | — | — | −7.58E−03 | −7.26E−03 |
| Surface 5 | 27.84 | 20.37 | — | — |

The phase function is expressed by the following formula (1).

$$\Phi = 2\pi/k\lambda \sum_{i,j} U_{i,j} Y^i Z^j \tag{1}$$

In this example, a diffraction order k in this formula is set to be 1 (k=1), and a wavelength λ is set to be 790 nm (λ=790 nm).

Table 5 shows aspherical surface coefficients of the first imaging lens 5a and the second imaging lenses 5b1 and 5b2 of the imaging optical system LB of the optical scanning apparatus 100 according to this embodiment.

TABLE 5

| Imaging lens 5b1y | Shape in meridional direction | | | | | | Shape in sagittal direction |
|---|---|---|---|---|---|---|---|
| | R | K | b4 | b6 | b8 | b10 | r |
| Surface 7 | −55.79 | 6.55E+06 | 8.43E−07 | 2.05E−09 | −2.21E−12 | 0.00E+00 | 8.00E+02 |
| Surface 8 | −36.84 | 1.07E−01 | 2.08E−06 | 2.37E−09 | 1.69E−14 | 2.26E−16 | −1.00E+03 |

Aspherical surface coefficients of imaging lens 5b1y according to first embodiment

| Imaging lens 5b1y | Shape in meridional direction | | | | | | Surface eccentric distance (mm) |
|---|---|---|---|---|---|---|---|
| | R | K | b4 | b6 | b8 | b10 | Z direction |
| Surface 9(Y >= 0) | −703.84 | 0.00 | 0.00E+00 | 0.00E+00 | 0.00E+00 | 0.00E+00 | −8.00 |
| Surface 9(Y < 0) | −703.84 | 0.00 | 0.00E+00 | 0.00E+00 | 0.00E+00 | 0.00E+00 | −8.00 |
| Surface 10(Y >= 0) | 1231.91 | −1.00 | −3.65E−07 | 3.84E−11 | −3.08E−15 | 1.08E−19 | −8.00 |
| Surface 10(Y < 0) | 1231.91 | −1.00 | −3.67E−07 | 3.91E−11 | −3.17E−15 | 1.13E−19 | −8.00 |

| Imaging lens 5b1y | Radius of curvature in sagittal direction | | | | | | |
|---|---|---|---|---|---|---|---|
| | r | K | e2 | e4 | e6 | e8 | e10 |
| Surface 9(Y >= 0) | 219.30 | 0.00 | 9.86E−05 | −5.10E−08 | 1.81E−12 | 6.00E−16 | −3.76E−20 |
| Surface 9(Y < 0) | 219.10 | 0.00 | 9.86E−05 | −5.10E−08 | 1.81E−12 | 6.00E−16 | −3.76E−20 |
| Surface 10(Y >= 0) | −36.46 | 0.00 | 7.32E−05 | −6.25E−09 | 2.14E−13 | 3.19E−16 | −2.97E−20 |
| Surface 10(Y < 0) | −36.46 | 0.00 | 7.21E−05 | −6.22E−09 | −1.01E−13 | 4.14E−16 | −3.85E−20 |

| Imaging lens 5b1y | Change in tilt in sagittal direction | | | | | | |
|---|---|---|---|---|---|---|---|
| | m0_1 | m2_1 | m4_1 | m6_1 | m8_1 | m10_1 | m12_1 |
| Surface 9(Y >= 0) | −4.08E−02 | 4.12E−06 | −2.16E−09 | 3.61E−13 | 1.16E−17 | −4.99E−21 | 4.79E−26 |
| Surface 9(Y < 0) | −4.08E−02 | 8.82E−07 | −5.25E−10 | 2.30E−13 | −2.63E−17 | 2.22E−21 | −2.33E−25 |
| Surface 10(Y >= 0) | 9.04E−02 | −6.06E−06 | 5.55E−10 | −2.18E−13 | 7.28E−17 | −6.20E−21 | −6.95E−26 |
| Surface 10(Y < 0) | 9.04E−02 | −8.33E−06 | 1.45E−09 | −1.13E−13 | −3.07E−19 | 3.55E−21 | −4.37E−25 |

Aspherical surface coefficient of imaging lens 5b1m according to first embodiment

| Imaging lens 5b1m | Shape in meridional direction | | | | | | Surface eccentric distance (mm) |
|---|---|---|---|---|---|---|---|
| | R | K | b4 | b6 | b8 | b10 | Z direction |
| Surface 9(Y >= 0) | −703.84 | 0.00 | 0.00E+00 | 0.00E+00 | 0.00E+00 | 0.00E+00 | −2.80 |
| Surface 9(Y < 0) | −703.84 | 0.00 | 0.00E+00 | 0.00E+00 | 0.00E+00 | 0.00E+00 | −2.80 |
| Surface 10(Y >= 0) | 1324.37 | −1.00 | −3.61E−07 | 3.79E−11 | −3.05E−15 | 1.08E−19 | −2.80 |
| Surface 10(Y < 0) | 1324.37 | −1.00 | −3.64E−07 | 3.96E−11 | −3.34E−15 | 1.24E−19 | −2.80 |

| Imaging lens 5b1m | Radius of curvature in sagittal direction | | | | | | |
|---|---|---|---|---|---|---|---|
| | r | K | e2 | e4 | e6 | e8 | e10 |
| Surface 9(Y >= 0) | 180.64 | 0.00 | 6.78E−05 | −5.13E−08 | 2.33E−12 | 6.56E−16 | −5.24E−20 |
| Surface 9(Y < 0) | 180.64 | 0.00 | 6.78E−05 | −5.13E−08 | 2.33E−12 | 6.56E−16 | −5.24E−20 |
| Surface 10(Y >= 0) | −37.54 | 0.00 | 8.01E−05 | −6.56E−09 | 1.01E−12 | 2.15E−16 | −3.21E−21 |
| Surface 10(Y < 0) | −37.54 | 0.00 | 7.17E−05 | −2.03E−09 | −6.91E−13 | 5.21E−16 | −2.59E−20 |

| Imaging lens 5b1m | Change in tilt in sagittal direction | | | | | | |
|---|---|---|---|---|---|---|---|
| | m0_1 | m2_1 | m4_1 | m6_1 | m8_1 | m10_1 | m12_1 |
| Surface 9(Y >= 0) | −6.14E−03 | −4.33E−07 | −1.32E−09 | 3.34E−13 | 1.08E−17 | −5.67E−21 | 4.79E−26 |
| Surface 9(Y < 0) | −6.14E−03 | −2.69E−06 | 2.71E−10 | 1.73E−13 | −3.78E−17 | 3.89E−21 | −2.33E−25 |
| Surface 10(Y >= 0) | 3.96E−02 | −4.23E−06 | 2.07E−10 | −1.32E−13 | 7.21E−17 | −7.28E−21 | −6.95E−26 |
| Surface 10(Y < 0) | 3.96E−02 | −5.67E−06 | 1.02E−09 | −8.16E−15 | −2.10E−17 | 5.21E−21 | −4.37E−25 |

Aspherical surface coefficients of imaging lens 5b2c according to first embodiment

| Imaging lens 5b2c | Shape in meridional direction | | | | | | Surface eccentric distance (mm) |
|---|---|---|---|---|---|---|---|
| | R | K | b4 | b6 | b8 | b10 | Z direction |
| Surface 9(Y >= 0) | −713.84 | 0.00 | 0.00E+00 | 0.00E+00 | 0.00E+00 | 0.00E+00 | 2.80 |
| Surface 9(Y < 0) | −713.84 | 0.00 | 0.00E+00 | 0.00E+00 | 0.00E+00 | 0.00E+00 | 2.80 |
| Surface 10(Y >= 0) | 1286.24 | −1.00 | −3.60E−07 | 3.77E−11 | −3.02E−15 | 1.07E−19 | 2.80 |
| Surface 10(Y < 0) | 1286.24 | −1.00 | −3.62E−07 | 3.82E−11 | −3.09E−15 | 1.09E−19 | 2.80 |

TABLE 5-continued

| Imaging lens 5b2c | Radius of curvature in sagittal direction | | | | | | |
|---|---|---|---|---|---|---|---|
| | r | K | e2 | e4 | e6 | e8 | e10 |
| Surface 9(Y >= 0) | 215.77 | 0.00 | 9.91E−05 | −5.17E−08 | 2.19E−12 | 5.90E−16 | −4.18E−20 |
| Surface 9(Y < 0) | 215.77 | 0.00 | 9.91E−05 | −5.17E−08 | 2.19E−12 | 5.90E−16 | −4.18E−20 |
| Surface 10(Y >= 0) | −36.39 | 0.00 | 7.44E−05 | −7.59E−09 | 6.84E−13 | 2.37E−16 | −2.67E−20 |
| Surface 10(Y < 0) | −36.39 | 0.00 | 7.15E−05 | −5.67E−09 | −2.62E−13 | 4.16E−16 | −3.87E−20 |

| Imaging lens 5b2c | Change in tilt in sagittal direction | | | | | | |
|---|---|---|---|---|---|---|---|
| | m0_1 | m2_1 | m4_1 | m6_1 | m8_1 | m10_1 | m12_1 |
| Surface 9(Y >= 0) | 5.95E−03 | −1.15E−06 | 1.53E−09 | −2.71E−13 | −1.08E−17 | 4.10E−21 | −9.88E−26 |
| Surface 9(Y < 0) | 5.95E−03 | 4.37E−06 | −6.33E−10 | −2.11E−13 | 3.76E−17 | 1.99E−22 | −1.83E−25 |
| Surface 10(Y >= 0) | −3.93E−02 | 2.63E−06 | 1.38E−10 | 1.02E−13 | −6.01E−17 | 6.86E−21 | −1.58E−25 |
| Surface 10(Y < 0) | −3.93E−02 | 7.25E−06 | −1.31E−09 | −2.66E−14 | 1.86E−17 | −1.56E−21 | 1.04E−25 |

Aspherical surface coefficients of imaging lens 5b2k according to first embodiment

| Imaging lens 5b2k | Shape in meridional direction | | | | | | Surface eccentric distance (mm) |
|---|---|---|---|---|---|---|---|
| | R | K | b4 | b6 | b8 | b10 | Z direction |
| Surface 9(Y >= 0) | −713.84 | 0.00 | 0.00E+00 | 0.00E+00 | 0.00E+00 | 0.00E+00 | 8.00 |
| Surface 9(Y < 0) | −713.84 | 0.00 | 0.00E+00 | 0.00E+00 | 0.00E+00 | 0.00E+00 | 8.00 |
| Surface 10(Y >= 0) | 1204.40 | −1.00 | −3.65E−07 | 3.86E−11 | −3.11E−15 | 1.10E−19 | 8.00 |
| Surface 10(Y < 0) | 1204.40 | −1.00 | −3.67E−07 | 3.97E−11 | −3.29E−15 | 1.20E−19 | 8.00 |

| Imaging lens 5b2k | Radius of curvature in sagittal direction | | | | | | |
|---|---|---|---|---|---|---|---|
| | r | K | e2 | e4 | e6 | e8 | e10 |
| Surface 9(Y >= 0) | 220.92 | 0.00 | 9.72E−05 | −5.20E−08 | 1.85E−12 | 6.33E−16 | −4.43E−20 |
| Surface 9(Y < 0) | 220.92 | 0.00 | 9.72E−05 | −5.20E−08 | 1.85E−12 | 6.33E−16 | −4.43E−20 |
| Surface 10(Y >= 0) | −36.41 | 0.00 | 7.56E−05 | −7.08E−09 | 5.16E−13 | 2.50E−16 | −1.86E−20 |
| Surface 10(Y < 0) | −36.41 | 0.00 | 6.90E−05 | −5.19E−09 | −2.87E−13 | 4.44E−16 | −3.72E−20 |

| Imaging lens 5b2k | Change in tilt in sagittal direction | | | | | | |
|---|---|---|---|---|---|---|---|
| | m0_1 | m2_1 | m4_1 | m6_1 | m8_1 | m10_1 | m12_1 |
| Surface 9(Y >= 0) | 4.40E−02 | −3.91E−06 | 2.38E−09 | −3.78E−13 | −7.03E−18 | 4.82E−21 | −9.17E−26 |
| Surface 9(Y < 0) | 4.40E−02 | −1.70E−06 | −1.78E−10 | −1.14E−13 | 3.36E−17 | 4.46E−22 | −4.44E−25 |
| Surface 10(Y >= 0) | −8.75E−02 | 6.63E−06 | −5.95E−10 | 2.71E−13 | −7.55E−17 | 6.15E−21 | 5.92E−26 |
| Surface 10(Y < 0) | −8.75E−02 | 7.00E−06 | −1.51E−09 | −2.52E−15 | 3.48E−17 | −1.54E−21 | −2.34E−25 |

The aspherical surface shape of the first imaging lens 5a and the second imaging lenses 5b1 and 5b2 are defined by the following formulas (2) to (5).

The origin of the imaging optical system LB is the intersection of the curved surface of the imaging lens and the optical axis, the X axis of the imaging optical system LB is an axis extending in the optical axis direction, the Y axis of the imaging optical system LB is an axis perpendicular to the optical axis in the main scanning cross section, and the Z axis of the imaging optical system LB is an axis perpendicular to the optical axis in the sub-scanning cross section. Then, provided that the intersection of the X-Y plane and the curved surface is a meridional, and the intersection of the X-Z plane and the curved surface is a sagittal line, the shape of the meridional is expressed by the following formula (2).

$$X = \frac{\frac{Y^2}{R}}{1+\sqrt{1-(1+K)\left(\frac{Y}{R}\right)^2}} + b_4 Y^4 + b_6 Y^6 + b_8 Y^8 + b_{10} Y^{10} \tag{2}$$

The shape of the sagittal line is expressed by the following formula (3).

$$S = \frac{Z^2/r'}{1+\sqrt{1-\left(\frac{Z}{r'}\right)^2}} + \sum_{i,j} m_{jk} Y^j Z^k \tag{3}$$

Therefore, the actual surface shape x is expressed by the following formula (4).

$$x = X + S \tag{4}$$

The radius of curvature r' of the sagittal line that varies with the value of Y is expressed by the following formula (5).

$$r' = r(1+E_2 Y^2 + E_4 Y^4 + E_6 Y^6 + E_8 Y^8 + E_{10} Y^{10}) \tag{5}$$

The aspherical surface coefficient is separately set for each of the formulas (3) and (5) on the assumption that Y≥0 is "upper", and Y≤0 is "lower".

The surface eccentric distance means that the formula (4) is developed from the coordinate in the sub-scanning direction of the value in the table with respect to the optical axis of the first imaging lens 5a.

Table 6 shows aspherical surface coefficients of the BD lens 10 of the BD optical system LC of the optical scanning apparatus 100 according to this embodiment.

TABLE 6

|  | Shape in meridional direction | Shape in sagittal direction |
|---|---|---|
| BD lens 10 | R | r |
| Surface 7 | 37.5 | 37.5 |
| Surface 8 | 0 | −29 |

The shape of the sagittal line is expressed by the formula (3). While the shape of the meridional is defined by the formula (2), the sagittal line is defined as the intersection of the X-Z plane and the curved surface in the direction perpendicular to the meridional.

Next, a configuration of the imaging optical system LB of the optical scanning apparatus 100 according to this embodiment will be described in detail.

The first imaging lens 5a is a shared lens through which all the light fluxes directed to the photosensitive drum surfaces 8y, 8m, 8c and 8k pass. The first imaging lens 5a has a strong refracting power (which is also referred to simply as power) in the main scanning cross section and a weak positive power in the sub-scanning cross section. However, the present invention does not depend on the sign and strength of the power of the first imaging lens 5a in the main scanning cross section and the sub-scanning cross section.

The second imaging lenses 5b1 and 5b2 have a weak refracting power in the main scanning cross section and a strong refracting power in the sub-scanning cross section. Because of the characteristics of the oblique incident optical system, the light flux incident on the second imaging lenses 5b1 and 5b2 is twisted in a peripheral region thereof. Therefore, deterioration of the wave aberration occurs, and therefore a spot is likely to deteriorate. To compensate for the deterioration of the wave aberration due to the twist of the light flux, the shape of the sagittal line of the second imaging lenses 5b1 and 5b2 is configured so that the amount of tilt in the sub-scanning direction of the sagittal line varies as it goes toward the peripheral region. More specifically, the changes m0_1 to m12_1 in tilt of the sagittal line of the second imaging lenses 5b1 and 5b2 shown in Table 5 correspond to the amount of tilt of the surface. According to this embodiment, the tilt of the sagittal line ensures a good spot shape even in the peripheral region.

The second imaging lens 5b1 is an imaging lens for the photosensitive drums 8y and 8m, and the second imaging lens 5b2 is an imaging lens for the photosensitive drums 8c and 8k. Each of the second imaging lenses 5b1 and 5b2 is a multilayer toric lens having two optical functional portions having different optical capabilities arranged in the sub-scanning direction. The optical functional portions are denoted by 5b1y, 5b1m, 5b2c and 5b2k in association with the photosensitive drum surfaces 8y, 8m, 8c and 8k to which the light fluxes having passed through the respective optical functional portions reach.

The optical functional portion is a combination of a first surface, on which a light flux is incident, and a second surface, from which the light flux exits, of the second imaging lens 5b1, 5b2. That is, the first surface is a surface closer to the polygon mirror 4, and the second surface is a surface closer to the photosensitive drum 8.

In the following, a specific configuration of the second imaging lens 5b2, that is, the optical functional portions 5b2c and 5b2k, according to the present invention will be described. The second imaging lens 5b1, that is, the optical functional portions 5b1y and 5b1m, can have the same configuration as the configuration described below.

For each of the light fluxes passing through the optical functional portions 5b2c and 5b2k, comparison of the sub-scanning oblique incident angle between the associated incident optical systems LA3 and LA4 shows that the sub-scanning oblique incident angles of the incident optical systems LA3 and LA4 have different absolute values but the same sign, as shown in FIG. 4 and Table 1.

Next, to investigate the trajectory of the light flux having the sub-scanning oblique incident angle deflected and reflected by the deflecting surface 4a of the polygon mirror 4, a virtual plane P perpendicular to the optical axis is set between the deflecting surface 4a and the first imaging lens 5a, and the point on the virtual plane P at which the light flux passes is determined.

Figure 6:
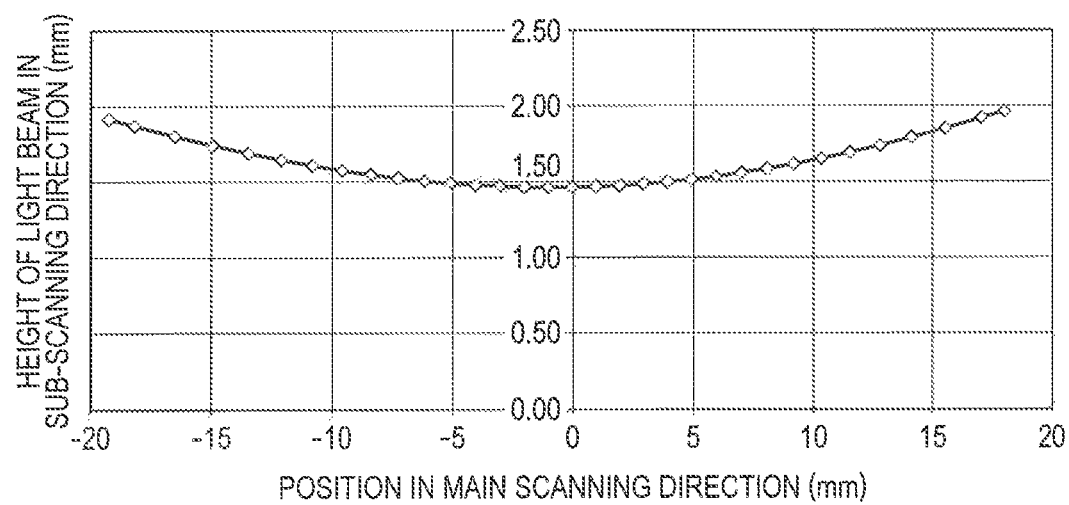
FIG. 6 is a graph showing the dependency on the position in a main scanning direction of the height in a sub-scanning direction of a light flux emitted from the incident optical system LA3 at a position 20 mm closer to a first imaging lens 5a than a deflecting surface 4a according to the first embodiment.

The result is shown in FIG. 6. FIG. 6 shows the dependency on the position in the main scanning direction of the height in the sub-scanning direction of the light flux emitted from the incident optical system LA3 at a position 20 mm closer to the first imaging lens 5a than the deflecting surface 4a. In FIG. 6, the origin of the position in the main scanning direction is the intersection of the light flux and the optical axis of the first imaging lens 5a.

As can be seen from FIG. 6, the absolute value of the height of the light flux is lowest on the axis and increases as the off-axis distance increases.

Specifically, the dependency $Z(\theta)$ of the height of the light flux on a scanning field angle $\theta$ (rad) in the main scanning direction is expressed by the following formula (6) using the scanning field angle $\theta$, a sub-scanning oblique incident angle $\alpha$ (rad) and the distance L (mm) from the deflecting surface 4a to the virtual plane P.

$$Z(\theta) = \frac{L}{\cos(\theta)} \tan(\alpha) \qquad (6)$$

That is, with the oblique incident optical system, the height of the light beam in the sub-scanning direction increases as the off-axis distance increases (that is, the absolute value of $\theta$ increases), and the absolute value of the height of the light beam increases as the oblique incident angle $\alpha$ increases.

The relationship that the absolute value of the height of the light beam in the sub-scanning direction is greater at an off-axis position than on the axis still holds true for the light flux having passed through the first imaging lens 5a having a weak positive power in the sub-scanning direction. Therefore, the position in the sub-scanning direction on the first surface of the optical functional portion 5b2c and 5b2k on which the light flux is incident is curved in such a manner that the absolute value increases as it goes away from the axis.

Light fluxes from the incident optical systems LA3 and LA4 whose sub-scanning oblique incident angles have different absolute values but the same sign are incident on the optical functional portions 5b2c and 5b2k. Therefore, a passing position on the first surface of the optical functional portion 5b2c, 5b2k of the light flux from the incident optical system LA3, LA4 is curved in the same direction but to different degrees as it goes away from the axis.

Figure 7A:
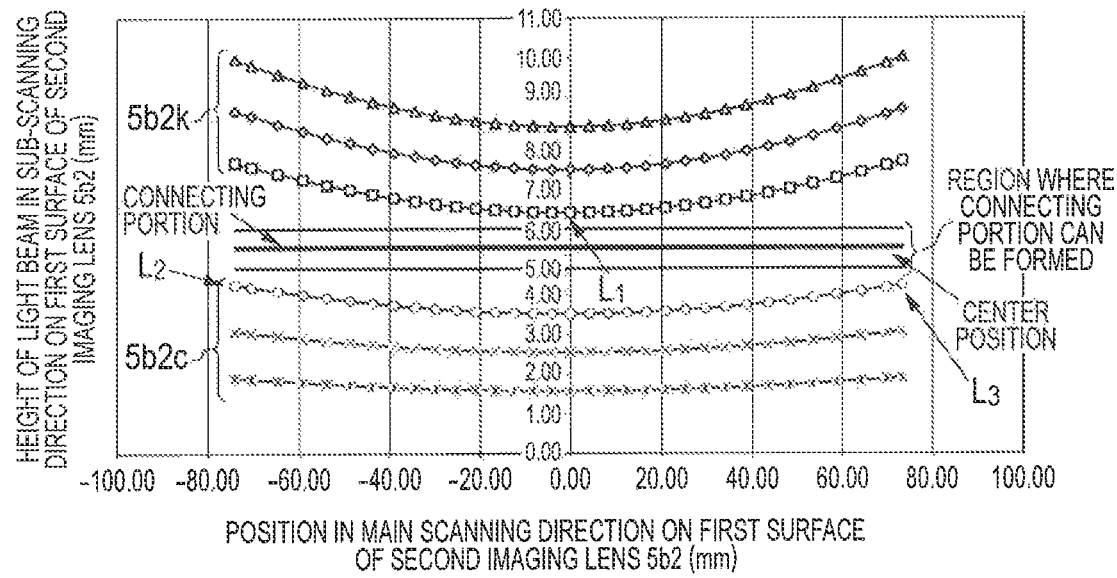
FIG. 7A is a graph showing the dependency on the position in the main scanning direction of the height in the sub-scanning direction of a principal ray and a marginal ray of a light flux emitted from the incident optical systems LA3 and LA4 that passes through a first surface of each of optical functional portions 5b2c and 5b2k according to the first embodiment.
Figure 7B:
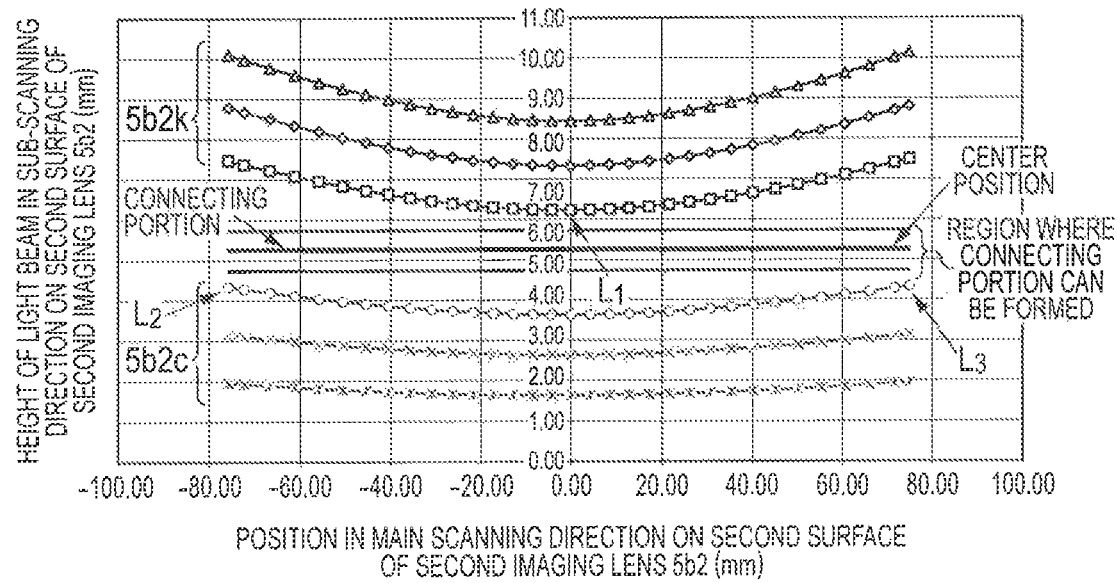
FIG. 7B is a graph showing the dependency on the position in the main scanning direction of the height in the sub-scanning direction of a principal ray and a marginal ray of a light flux emitted from the incident optical systems LA3 and LA4 that passes through a second surface of each of the optical functional portions 5b2c and 5b2k according to the first embodiment.

FIG. 7A shows the dependency on the position in the main scanning direction of the height in the sub-scanning direction of a principal ray and a marginal ray of the light flux emitted from the incident optical system LA3, LA4 that passes through the first surface of each of optical functional portions 5b2c and 5b2k, and FIG. 7B shows the dependency on the position in the main scanning direction of the height in the sub-scanning direction of the principal ray and the marginal ray of the light flux emitted from the incident optical system LA3, LA4 that passes through the second surface of each of the optical functional portions 5b2c and 5b2k. In FIGS. 7A and 7B, the origin in the main scanning direction is the intersection of the optical flux and the optical axis of the first imaging lens 5a.

As can be seen from FIGS. 7A and 7B, of all the light beams passing through the optical functional portion 5b2c and all the light beams passing through the optical functional portion 5b2k, an on-axis marginal ray $L_1$ passing through the optical functional portion 5b2k and outermost off-axis marginal rays $L_2$ and $L_3$ passing through the optical functional portion 5b2c are closest to each other in the sub-scanning direction.

In general, plastic molded lenses are often used as imaging lens in the optical scanning apparatus from the viewpoint of mass-producibility and workability of aspherical surfaces. The second imaging lenses 5b1 and 5b2 of the optical scanning apparatus 100 according to this embodiment are also plastic molded lenses. Although the first imaging lens 5a is also a plastic molded lens in this embodiment, the material and manufacturing method of the first imaging lens 5a is not particularly limited according to the present invention.

As described above, in the imaging lenses 5b1 and 5b2 of the optical scanning apparatus 100 according to this embodiment, two optical functional portions having different optical capabilities are arranged side by side in the sub-scanning direction. Therefore, there is a connecting portion between the two optical functional portions arranged side by side in the sub-scanning direction. The two optical functional portions cannot be smoothly bonded to each other by simply expanding the optical functional portions toward the connecting portion. A sag (maximum height difference) Δsag1 is formed on the first surface at the connecting portion, and a sag Δsag2 is formed on the second surface at the connecting portion. In general, if the sag Δsag1, Δsag2 is greater than 0.2 mm, the transferability of the surface shape in molding can deteriorate. Therefore, conditions that 0≤Δsag1≤0.2 mm and 0≤Δsag2≤0.2 mm are preferably satisfied.

Figure 8:
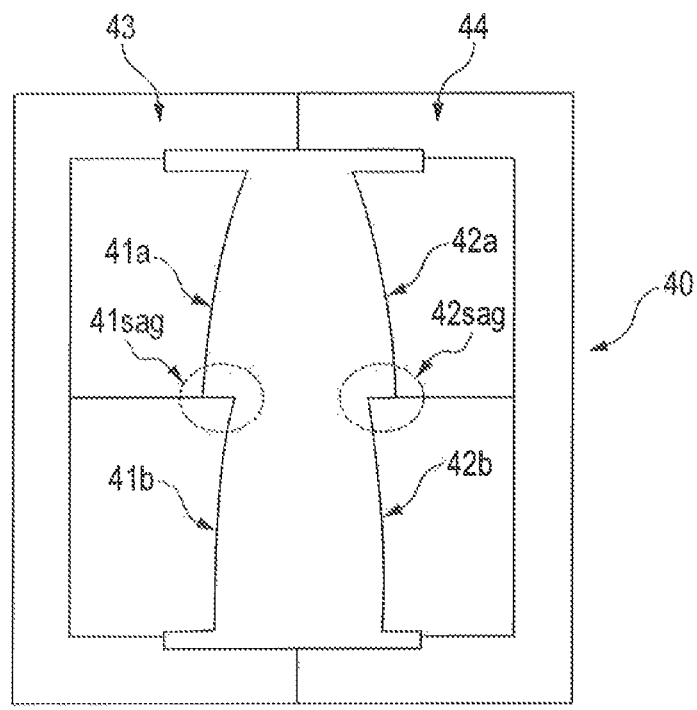
FIG. 8 is a diagram showing a molding die 40 for a multi-layer toric lens having two optical functional portions for an imaging lens of a conventional optical scanning apparatus.

FIG. 8 is a diagram showing a molding die 40 for a multi-layer toric lens having two optical functional portions for an imaging lens of a conventional optical scanning apparatus. The molding die 40 has mirror surface pieces 41a, 41b, 42a and 42d that transfer the shapes of the respective optical functional portions to the multi-layer toric lens and clamping pieces 43 and 44 that hold the mirror surface pieces. As described above, a sag 41sag is formed at the connecting portion between the mirror surface pieces 41a and 41b, and a sag 42sag is formed at the connecting portion between the mirror surface pieces 42a and 42b.

Figure 9:
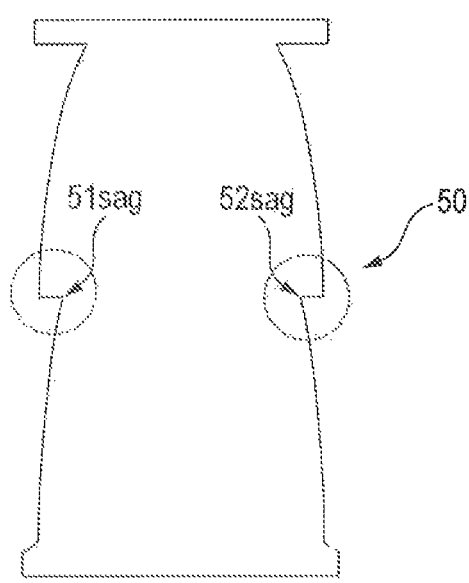
FIG. 9 is a diagram showing a multi-layer toric lens 50 molded with the molding die 40.

FIG. 9 shows a multi-layer toric lens 50 molded with the molding die 40. The multi-layer toric lens 50 has sags 51sag and 52sag that are transferred from the sags 41sag and 42sag of the mirror surface pieces.

At the sags, the contact area between the die 40 and the lens 50 is larger. Therefore, the thermal shrinkage differs between the sags and the other parts, and the sags 51sag and 52sag expand during molding of the lens 50.

To provide a smooth connecting portion, the end parts of the upper and lower optical functional portions to be connected to each other may be shaped into a spline curve. In that case, however, the light flux may pass through the spline curve region, which is the connecting portion, if the position where the light flux passes through the optical functional portions is displaced in the sub-scanning direction due to a tolerance.

Figure 10:
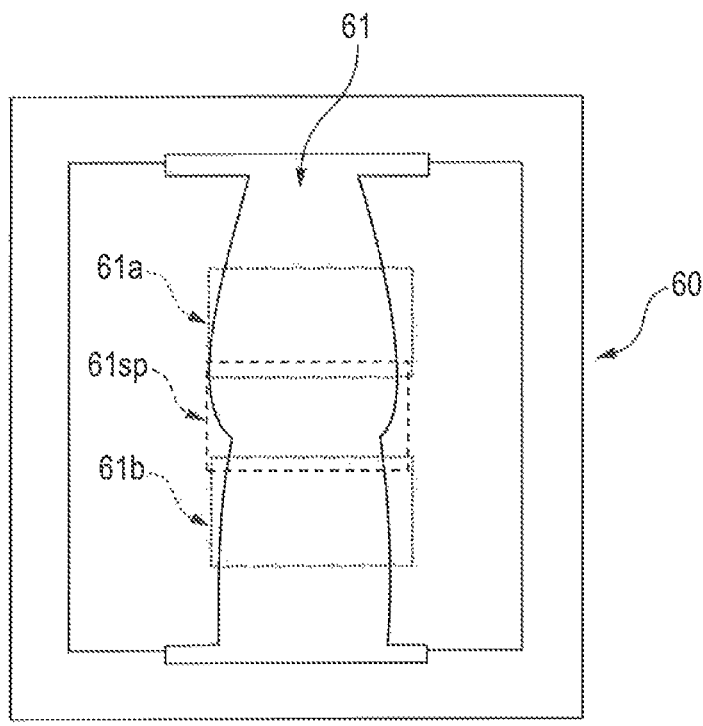
FIG. 10 is a diagram showing a molding die 60 for an imaging lens of a conventional optical scanning apparatus and a multi-layer toric lens 61 molded with the molding die 60.

FIG. 10 shows a molding die 60 in which the connecting portion has a spline curve surface and the upper and lower optical functional portions are smoothly connected to each other, and a multi-layer toric lens 61 molded with the molding die 60. Reference numeral 61a denotes a light beam passing region including a tolerance of the upper optical functional portion, reference numeral 61b denotes a light beam passing region including a tolerance of the lower optical functional portion, and reference numeral 61sp denotes a spline curve region between the upper and lower optical functional portions. To provide the smooth connection at the sag, the spline curve region 61sp is expanded, and the light beam passing regions 61a and 61b overlap with the spline curve region 61sp.

In general, the spline curve region is formed by giving a higher priority to smoothly connecting the upper and lower optical functional portions to allow stable molding of the lens than to ensuring the optical properties, so that the shape of a spot on the scanned surface deteriorates. Therefore, if the multi-layer toric lens 61 is used, the quality of printing can deteriorate.

Therefore, when the spline curve region is formed at the connecting portion, the spline curve region needs to be spaced apart from the light beam passing regions as far as possible.

As described above, the light beams closest to each other on the first surface of the second imaging lens 5b2 in the light fluxes directed to the photosensitive drums 8c and 8k according to this embodiment are the marginal ray $L_1$ passing through the optical functional portion 5b2k at an axial image height and one of the marginal rays $L_2$ and $L_3$ passing through the optical functional portion 5b2c at an outermost off-axis image height.

Therefore, the connecting portion between the upper and lower optical functional portions need to be formed in a region adequately spaced apart from the light beams $L_1$, $L_2$ and $L_3$.

FIG. 7A shows a center position between the light beams $L_1$ and one of the light beams $L_2$ and $L_3$ in the sub-scanning direction on the first surface of the optical functional portion 5b2c, 5b2k of the second imaging lens 5b2 of the optical scanning apparatus 100 according to this embodiment, and FIG. 7B shows a center position between the light beams $L_1$ and one of the light beams $L_2$ and $L_3$ in the sub-scanning direction on the second surface of the optical functional portion 5b2c, 5b2k of the second imaging lens 5b2 of the optical scanning apparatus 100 according to this embodiment. FIGS. 7A and 7B also show the connecting portion between the optical functional portions 5b2c and 5b2k and a region where the connecting portion can be formed.

With the optical scanning apparatus 100 according to this embodiment, the center position on the first surface of the second imaging lens 5b2 between the height in the sub-scanning direction of the marginal ray $L_1$ passing through the optical functional portion 5b2k at the axial image height and the height in the sub-scanning direction of one of the marginal rays $L_2$ and $L_3$ passing through the optical functional portion 5b2c at the outermost off-axis image height is determined to be 5.18 mm. Similarly, the center position on the second surface of the second imaging lens 5b2 between the height in the sub-scanning direction of the marginal ray $L_1$ passing through the optical functional portion 5b2k at the axial image height and the height in the sub-scanning direction of one of the marginal rays $L_2$ and $L_3$ passing through the optical functional portion 5b2c at the outermost off-axis image height is determined to be 5.29 mm.

Therefore, in the optical scanning apparatus 100 according to this embodiment, the connecting portion is formed at a position of 5.23 mm, which is an average of these values.

Provided that the center position on one of the first surface and the second surface of the second imaging lens 5b2 between the height in the sub-scanning direction of the marginal ray passing through the upper optical functional portion in the sub-scanning direction at the axial image height and the height in the sub-scanning direction of the marginal ray passing through the lower optical functional portion in the sub-scanning direction at the outermost off-axis image height is denoted as $Z_0$ (mm), the position $Z_1$ (mm) of the connecting portion in the sub-scanning direction is preferably set to satisfy the condition expressed by the following formula (7).

$$Z_0 - 0.5 \text{ mm} \leq Z_1 \leq Z_0 + 0.5 \text{ mm} \qquad (7)$$

With such a setting, the connecting portion can be adequately spaced apart from all the light beams passing through the upper and lower optical functional portions. If the conditional formula (7) is not satisfied, the connecting portion can be close to the light flux, so that the light flux is more likely to be affected by the connecting portion due to a tolerance and the like, and the optical capabilities can deteriorate.

With the optical scanning apparatus 100 according to this embodiment, the connecting portion between the upper and lower optical functional portions is formed at the same position on the first surface and the second surface. However, as far as the conditional formula (7) is satisfied, the connecting portion can be formed at different positions on the first surface and the second surface.

As described above, the optical functional portions 5b2c and 5b2k have different aspherical surface shapes, such as tilt surface change amount, in order to form good spots of light fluxes having different sub-scanning oblique incident angles on the scanned surface. Therefore, the optical functional portion 5b2c and 5b2k cannot be continuously connected to each other at the connecting portion, and a sag in the optical axis direction is formed.

Figure 11:
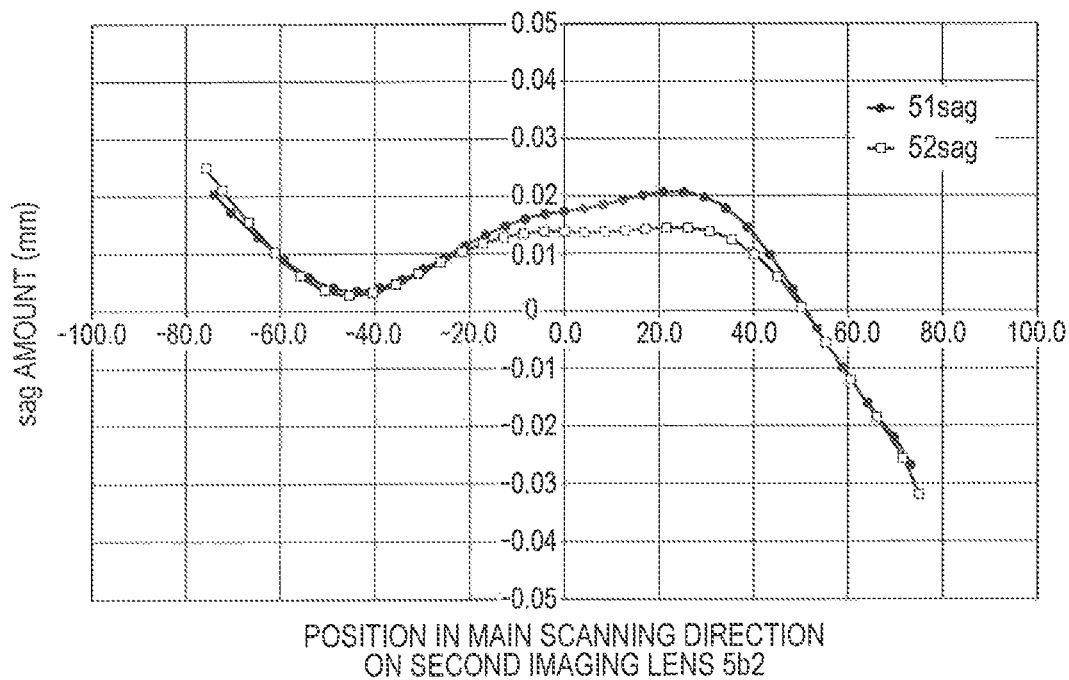
FIG. 11 is a graph showing the dependency on the position in the main scanning direction of sag amounts 41sag and 42sag at the connecting portion between the first surface and the second surface of the optical functional portions 5b2c and 5b2k of a second imaging lens 5b2 according to the first embodiment.

FIG. 11 shows the dependency on the position in the main scanning direction of the sag amounts 51sag and 52sag at the connecting portions on the first and second surfaces between the optical functional portions 5b2c and 5b2k of the second imaging lens 5b2.

As shown in FIG. 11, according to this embodiment, the sag amounts 51sag and 52sag decreases to 0 as the position in the main scanning direction goes from the on-axis position to the outermost off-axis positions, and then the sign is inverted. More specifically, the sign is inverted at 80 percent or more of the image heights with respect to one outermost off-axis position. To achieve such a setting, the thicknesses of the optical functional portions 5b2c and 5b2k of the second imaging lens 5b2 are changed.

With such a setting, the sag amounts 51sag and 52sag can be reduced.

That is, with the optical scanning apparatus according to this embodiment, in a plane including a connecting portion, the first surface (incident surface) of a first optical functional portion and the first surface (incident surface) of a second optical functional portion overlap with each other at least on a first point, and/or the second surface (exit surface) of the first optical functional portion and the second surface (exit surface) of the second optical functional portion overlap with each other at least on a second point.

In other words, with the optical scanning apparatus according to this embodiment, in a plane including a connecting portion, at least the incident surfaces of the first and second optical functional portions or the exit surfaces of the first and second optical functional portions overlap with each other at least one point.

In a predetermined region on one side of the first point in the main scanning direction, viewed from the optical axis direction of the first optical functional portion, in the plane including the connecting portion, the first surface (incident surface) of the first optical functional portion is located closer to the deflection unit than the first surface (incident surface) of the second optical functional portion. In addition, in a predetermined region on the other side of the first point, viewed from the optical axis direction of the first optical functional portion, in the plane including the connecting portion, the first surface (incident surface) of the second optical functional portion is located closer to the deflection unit than the first surface (incident surface) of the first optical functional portion.

In addition, in a predetermined region on the one side of the second point in the main scanning direction, viewed from the optical axis direction of the first optical functional portion, in the plane including the connecting portion, the second surface (exit surface) of the second optical functional portion is located closer to the deflection unit than the second surface (exit surface) of the first optical functional portion. In addition, in a predetermined region on the other side of the second point, viewed from the optical axis direction of the first optical functional portion, in the plane including the connecting portion, the second surface (exit surface) of the first optical functional portion is located closer to the deflection unit than the second surface (exit surface) of the second optical functional portion.

The first point is set to divide the distance between the maximum image heights in the main scanning direction (effective diameter in the main scanning direction) in the ratio of a to (10-a), and the second point is set to divide the same distance in the ratio of b to (10-b) (a and b are equal to or greater than 8).

Figure 12A:
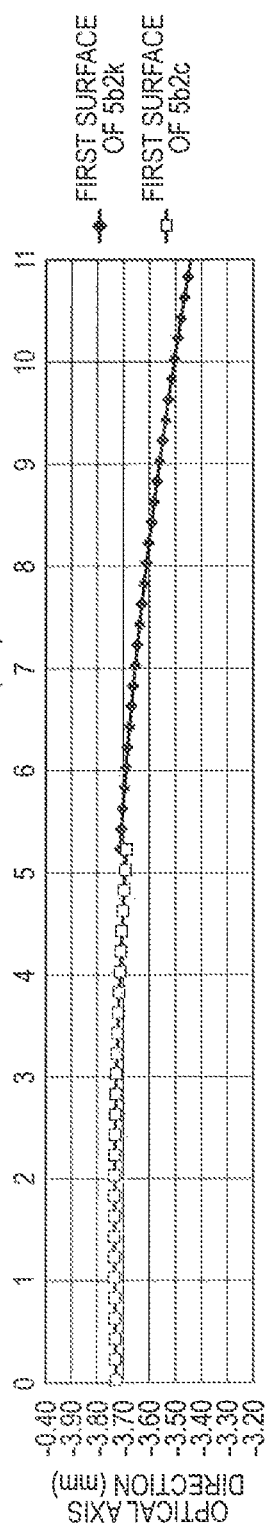
FIG. 12A shows graphs showing design shapes in the sub-scanning cross section at an axial image height and an outermost off-axis image height of the first surface of the optical functional portions 5b2c and 5b2k of the second imaging lens 5b2 according to the first embodiment.
Figure 12A:
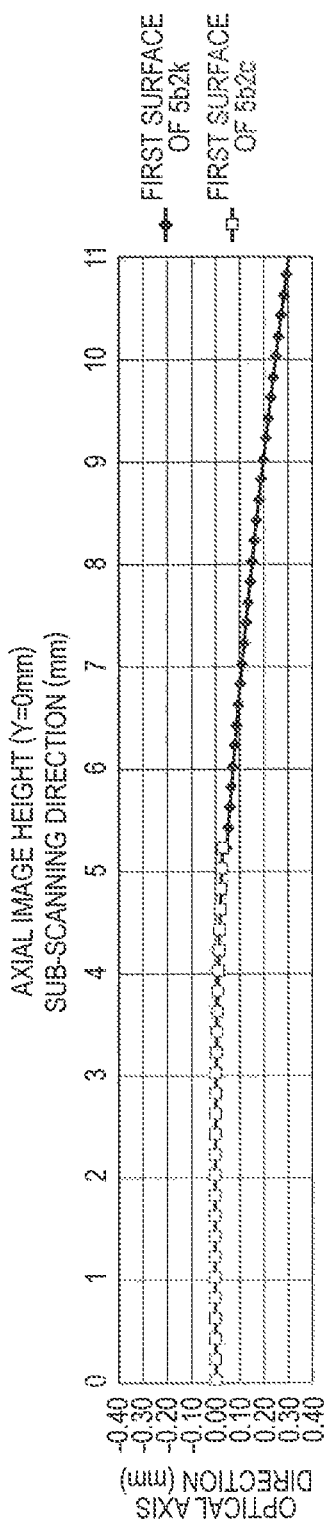
Figure 12A:
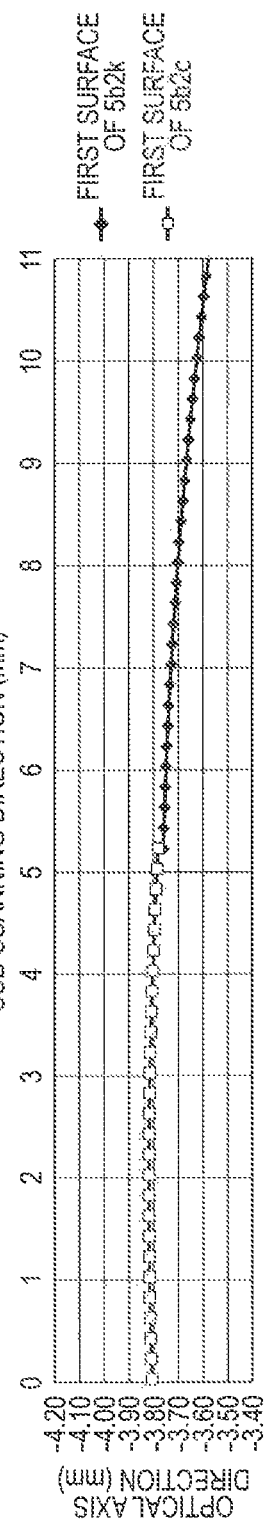
Figure 12B:
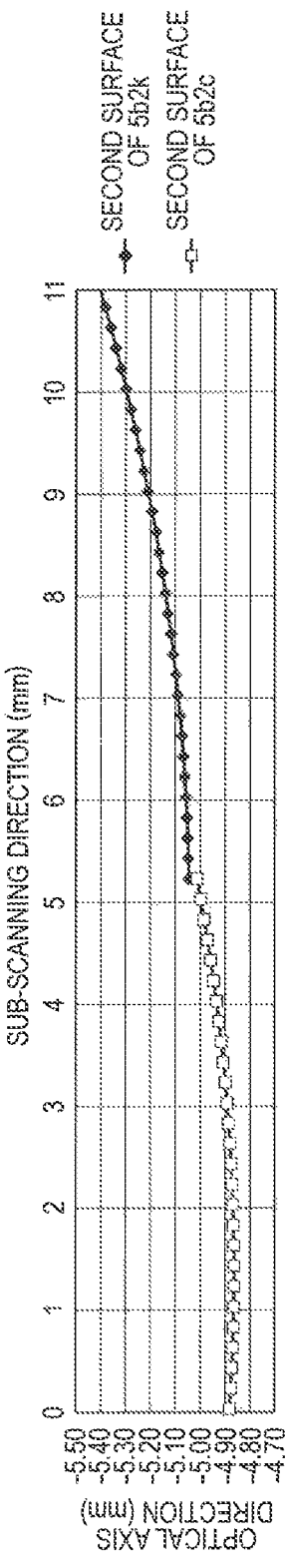
FIG. 12B shows graphs showing design shapes in the sub-scanning cross section at the axial image height and the outermost off-axis image height of the second surface of the optical functional portions 5b2c and 5b2k of the second imaging lens 5b2 according to the first embodiment.
Figure 12B:
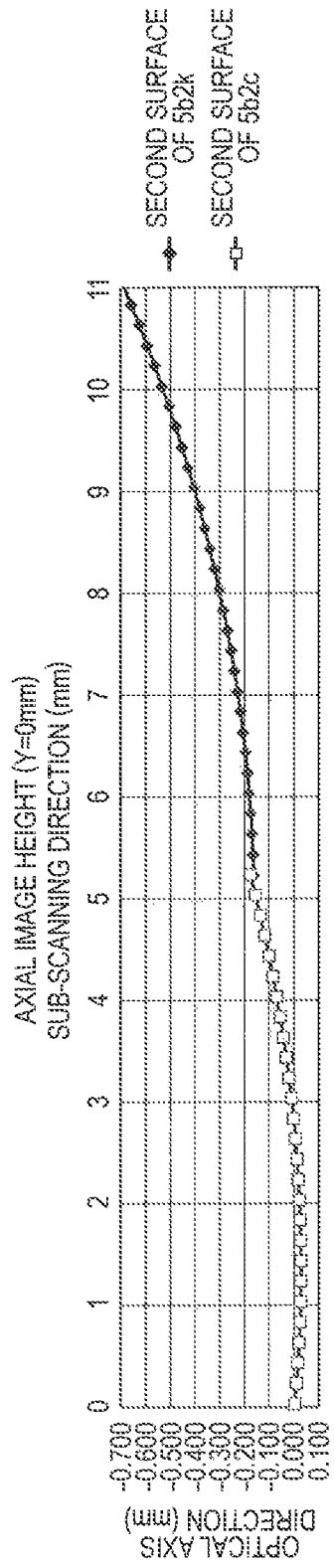
Figure 12B:
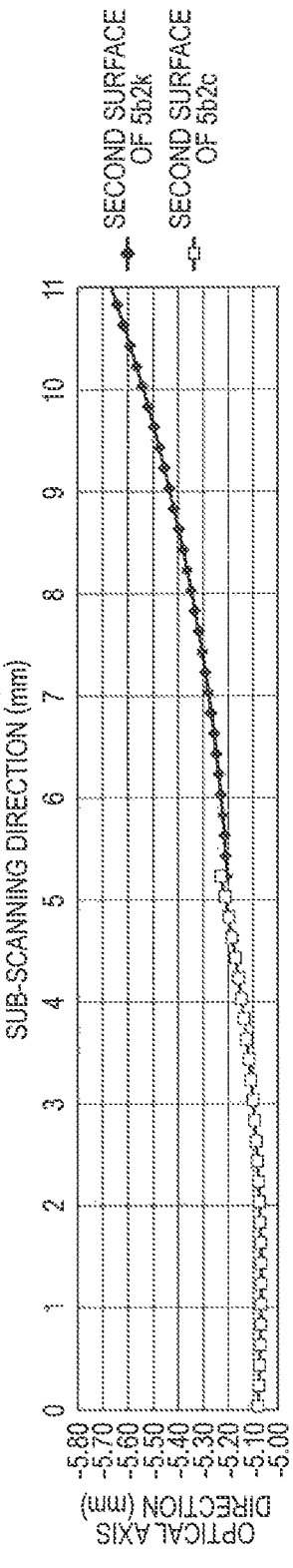

FIG. 12A shows design shapes in the sub-scanning cross section at the axial image height and the outermost off-axis image height of the first surface of the optical functional portions 5b2c and 5b2k of the second imaging lens 5b2, and FIG. 12B shows design shapes in the sub-scanning cross section at the axial image height and the outermost off-axis image height of the second surface of the optical functional portions 5b2c and 5b2k of the second imaging lens 5b2. In FIGS. 12A and 12B, the position in the optical axis direction is with respect to a surface apex position of the optical functional portion 5b2c, and the position in the sub-scanning direction is with respect to the optical axis of the first imaging lens 5a.

Since the axial image height and the outermost off-axis image height have inverted signs in this way, the absolute value of the sag amount can be reduced.

FIG. 13A shows a multi-layer toric lens 90 used as the second imaging lenses 5b1 and 5b2 of the optical scanning apparatus 100 according to this embodiment, to which the design described above is applied.

According to this embodiment, the thickness of each optical functional portion is adjusted so that the axial image height and the outermost off-axis image height have inverted signs. As a result, as shown in FIG. 13A, a maximum sag amount 91sag of the connecting portion of the multi-layer toric lens 90 is 0.03 mm, which is sufficiently smaller than the sag amount 51sag of the connecting portion of the conventional multi-layer toric lens 50 shown in FIG. 9. Therefore, the transferability at the sag 91sag of the multi-layer toric lens 90 is less likely to deteriorate.

FIG. 13B is a cross-sectional view of the connecting portion of the multi-layer toric lens 90 shown in FIG. 13A viewed from the sub-scanning direction.

As can be seen from the drawing, in the plane including the connecting portion, the incident surface of the first optical functional portion and the incident surface of the second optical functional portion overlap with each other at least first points (P1 and P2), and the exit surface of the first optical functional portion and the exit surface of the second optical functional portion overlap with each other at least second points (Q1 and Q2).

Next, a second embodiment of the present invention will be described.

According to the second embodiment, the first optical functional portion and the second optical functional portion of the second imaging lenses 5b1 and 52b are connected to one end and the other end of the connecting portion in the sub-scanning direction, respectively. The second embodiment differs from the first embodiment in that the second surface (exit surface) of the first optical functional portion and the second surface (exit surface) of the second optical functional portion are connected to each other by a spline curve surface included in the connecting portion.

Since the second surfaces are connected by a spline curve surface, the mirror surface pieces for forming the second surfaces of the multi-layer toric lens for the second imaging lenses 5b1 and 5b2 according to this embodiment can be integrated.

FIG. 14 is a diagram showing the dependency on the position in the main scanning direction of the height of the principal ray and the marginal ray of the light flux emitted from the incident optical systems LA3 and LA4 that passes through the second surface of each of the optical functional portions 5b2c and 5b2k of the second imaging lens 5b2, which corresponds to the diagram of FIG. 7B. FIG. 14 shows a spline curve region included in the connecting portion for the second surfaces of the optical functional portions 5b2c and 5b2k of the second imaging lens 5b2.

According to this embodiment, an arbitrary position in the sub-scanning direction included in the spline curve region (in one of an incidence-side connecting surface and an emission-side connecting surface) is denoted by $Z_{sp}$. Furthermore, a center position between the height in the sub-scanning direction of the marginal ray passing through the upper optical functional portion in the sub-scanning direction at the axial image height and the height in the sub-scanning direction of the marginal ray passing through the lower optical functional portion in the sub-scanning direction at the outermost off-axis image height on one of the first surface (incident surface) and the second surface (exit surface) of the second imaging lens 5b2 is denoted by $Z_0$ (mm). Then, the condition expressed by the following formula (8) is preferably satisfied.

$$Z_0 - 0.5 \text{ mm} \leq Z_{sp} \leq Z_0 + 0.5 \text{ mm} \quad (8)$$

By forming the spline curve region so as to satisfy the condition expressed by the formula (8), any light beam can be prevented from passing through the spline curve region, thereby reducing deterioration of the imaging capability, even if the position in the sub-scanning direction at which the light flux is incident on the second imaging lens 5b2 is displaced in the sub-scanning direction due to a tolerance and the like.

According to this embodiment, the spline curve region is formed so that $Z_{sp}$ satisfies the condition expressed by the following formula (9).

$$4.89 \text{ mm} \leq Z_{sp} \leq 5.69 \text{ mm} \quad (9)$$

Since $Z_0 = 5.29$ mm as described above, it can be seen that the spline curve regions of the connecting portions of the second surfaces (exit surface) of the optical functional portions 5b2c and 5b2k of the second imaging lens 5b2 according to this embodiment satisfy the condition expressed by the formula (8).

Figure 15:
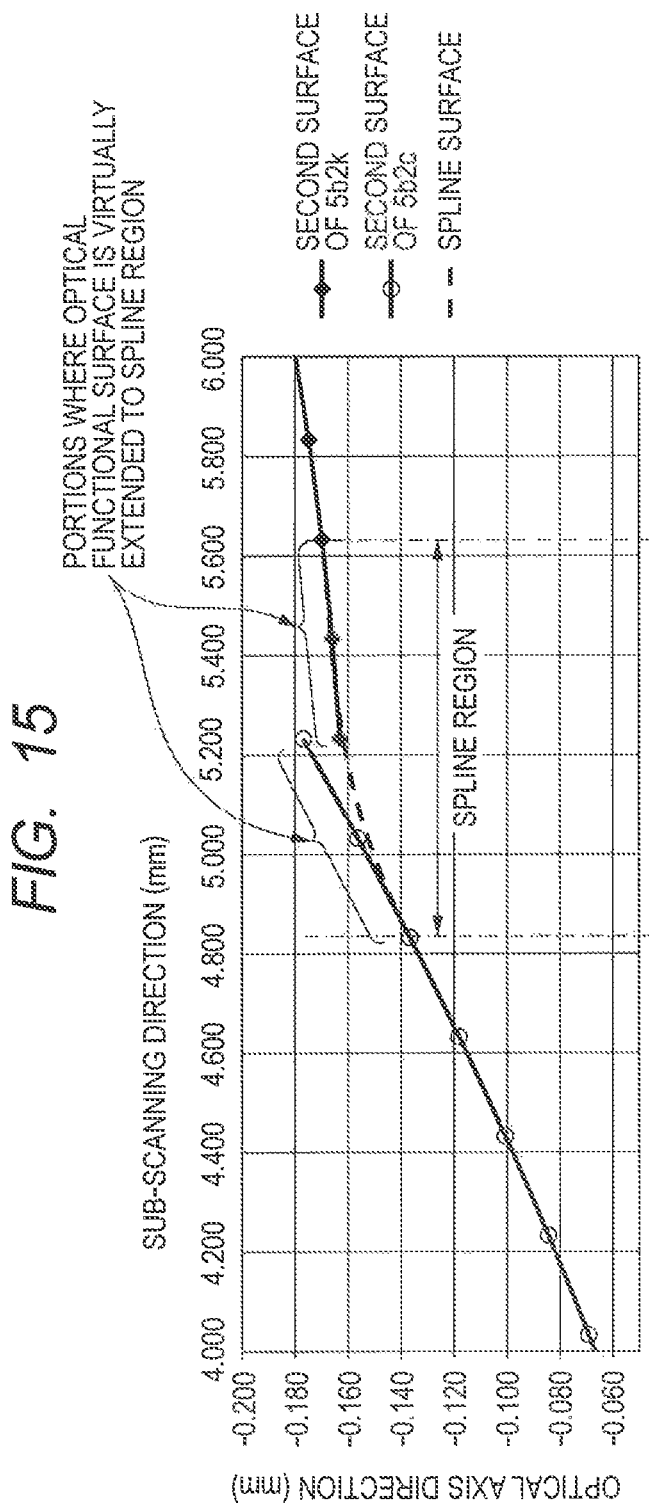
FIG. 15 is a graph showing a design shape in the sub-scanning cross section at the axial image height of the second surface of the optical functional portions 5b2c and 5b2k of the second imaging lens 5b2 according to the second embodiment.
Figure 16A:
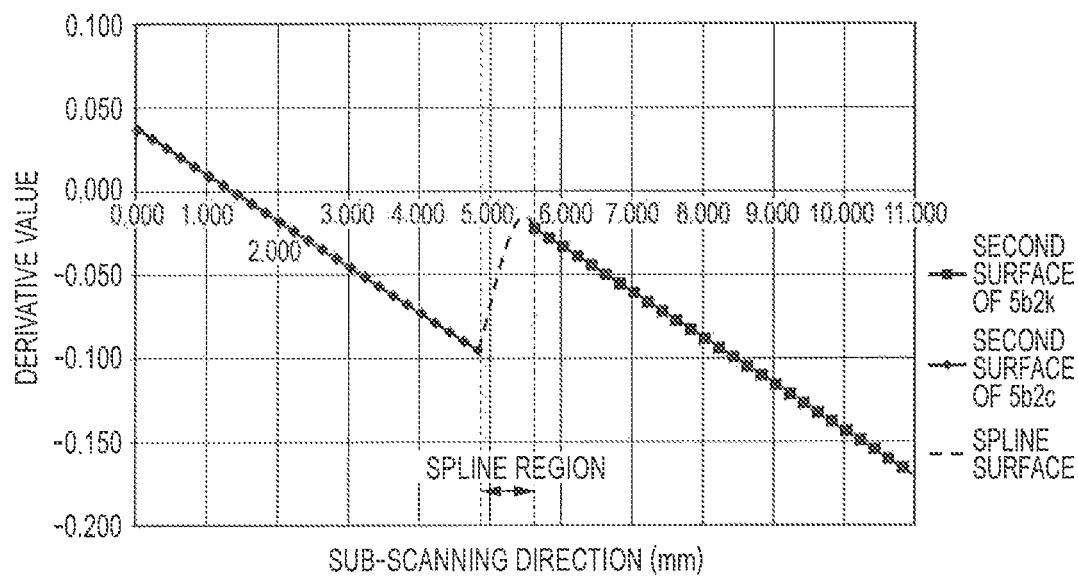
FIG. 16A is a graph showing the value of a first-order derivative in the sub-scanning direction of the sub-scanning cross section shape at the axial image height of the second surface of the optical functional portions 5b2c and 5b2k of the second imaging lens 5b2 according to the second embodiment.
Figure 16B:
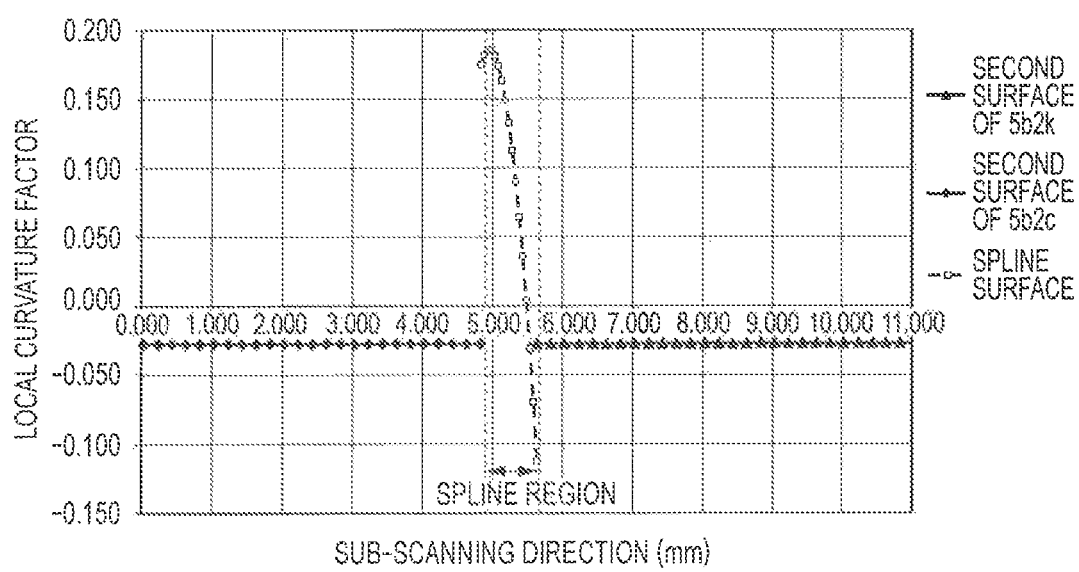
FIG. 16B is a graph showing a local curvature of the first-order derivative in the sub-scanning direction of the sub-scanning cross section shape at the axial image height of the second surface of the optical functional portions 5b2c and 5b2k of the second imaging lens 5b2 according to the second embodiment.

FIG. 15 shows a design shape in the sub-scanning cross section of the second surface of the optical functional portions 5b2c and 5b2k of the second imaging lens 5b2 at the axial image height. FIG. 16A shows the value of the first-order derivative in the sub-scanning direction of the cross-sectional shape of the second surface (exit surface) of the optical functional portions 5b2c and 5b2k of the second imaging lens 5b2 at the axial image height, and FIG. 16B shows a local curvature of the first-order derivative in the sub-scanning direction of the cross-sectional shape of the second surface (exit surface) of the optical functional portions 5b2c and 5b2k of the second imaging lens 5b2 at the axial image height.

Table 7 shows a spline coefficient at the axial image height of the spline curve surface included in the connecting portion of the second surface of the optical functional portions 5b2c and 5b2k of the second imaging lens 5b2.

TABLE 7

| Spline coefficient at axial image height of spline curve surface of second surface of second imaging lens 5b2 | | | | | |
|---|---|---|---|---|---|
| a | b | c | d | e | h |
| −0.05479 | −0.05397035 | 0.063096583 | −0.03288895 | −0.16200136 | 5.233 |

The spline curve surface shape is expressed by the following formula (10), where X denotes the distance in the optical axis direction from the surface apex position of the second surface of the optical functional portion 5b2c of the second imaging lens 5b2, and z denotes the coordinate in the sub-scanning direction with respect to the optical axis of the first imaging lens 5a.

$$X = a(z-h)^4 + b(z-h)^3 + c(z-h)^2 + d(z-h) + e \quad (10)$$

As shown by the solid line in FIG. 15, if no spline curve surface is provided, a sag occurs when the optical functional portions 5b2c and 5b2k are extended to the middle position of the connecting portion in the sub-scanning direction. According to this embodiment, however, since the spline curve surface is provided, the optical functional portions 5b2c and 5b2k are smoothly connected to each other as shown by the dashed line.

Although not shown in the drawing, according to this embodiment, the optical functional portions 5b2c and 5b2k are also smoothly connected to each other at other than the axial image height.

That is, with the optical scanning apparatus according to this embodiment, an extension of the second surface (exit surface) of the first optical functional portion toward the second optical functional portion and an extension of the second surface (exit surface) of the second optical functional portion toward the first optical functional portion overlap with each other at least at the second point.

In a predetermined region on one side of the second point in the main scanning direction, viewed from the optical axis direction of the first optical functional portion, the extension of the second surface (exit surface) of the first optical functional portion toward the second optical functional portion is located closer to the deflection unit than the extension of the second surface (exit surface) of the second optical functional portion toward the first optical functional portion. In a predetermined region on the other side of the second point, viewed from the optical axis direction of the first optical functional portion, the extension of the second surface (exit surface) of the second optical functional portion toward the first optical functional portion is located closer to the deflection unit than the extension of the second surface (exit surface) of the first optical functional portion toward the second optical functional portion.

It can be seen that the surface shapes and derivatives of the surface shapes of the optical functional portions that would otherwise be discontinuous at the connecting portion are continuously connected by the spline curve surface. However, the shape continuity referred to herein means that the conditions expressed by the following formulas (11) and (12) are satisfied, where $\Delta x$ denotes the sag due to a spline fit error on the spline curve surface and the second surfaces of the optical functional portions $5b2c$ and $5b2k$, and $\Delta\theta$ denotes an error in terms of angle of the derivative value (sec).

$$\Delta x \leq 100 \text{ nm} \tag{11}$$

$$\Delta\theta \leq 30 \text{ sec} \tag{12}$$

In this embodiment, a reason why the formulas (11) and (12) are set is as follows. That is, the optical functional portions $5b2c$ and $5b2k$ of the second imaging lens $5b2$ have different surface shapes on the first surface and the second surface in the main scanning direction and the sub-scanning direction. Thus, it is difficult to continuously connect the shapes and derivatives of the shapes of the optical functional portions $5b2c$ and $5b2k$ on the first surface and the second surface at all the image heights, and a spline connection error inevitably occurs. However, if the spline error falls within the ranges expressed by the formulas (11) and (12), deterioration of the precision of cutting of the mirror surface pieces forming the upper and lower optical functional portions of the second surface of the second imaging lenses $5b1$ and $5b2$ can be reduced. As a result, the mirror surface pieces can be integrally formed without causing deterioration of the mirror surface precision.

According to this embodiment, higher priority is given to continuously connecting the shapes and derivatives of the shapes of the upper and lower optical functional portions. Therefore, the local curvature of the first-order derivative in the sub-scanning direction of the sub-scanning cross-sectional shape of the second surface of the optical functional portions $5b2c$ and $5b2k$ of the second imaging lens $5b2$ at the axial image height shown in FIG. 16B is inverted in sign and discontinuous at the connecting portions between the spline curve surface and the optical functional portions $5b2c$ and $5b2k$.

Figure 17:
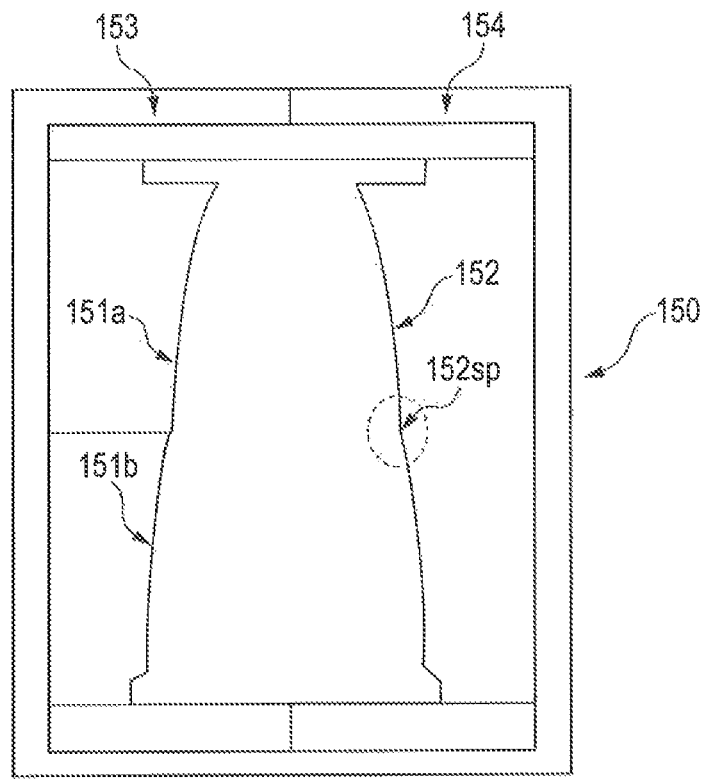
FIG. 17 is a diagram showing a molding die 150 for a multi-layer toric lens having two optical functional portions 5b2c and 5b2k for the second imaging lens 5b2 according to the second embodiment.

FIG. 17 shows a molding die 150 for a multi-layer toric lens having two optical functional portions $5b2c$ and $5b2k$ for the second imaging lens $5b2$ according to this embodiment. The molding die 150 has mirror surface pieces 151a, 151b and 152 that transfer the shapes of the respective optical functional portions to the multi-layer toric lens and clamping pieces 153 and 154 that hold the mirror surface pieces. The mirror surface piece 152 has a spline curve part 152sp.

Comparison with the conventional example shown in FIG. 8 shows that, according to this embodiment, since the optical functional portions $5b2c$ and $5b2k$ of the second imaging lens $5b2$ are connected to each other by the spline curve surface, an integrally molded mirror surface piece 152 suffices for forming the second surface of the optical functional portions $5b2c$ and $5b2k$. Therefore, displacement of the transfer positions of the optical functional portions that occurs in molding due to misalignment of the upper and lower mirror surface pieces can be reduced.

According to this embodiment, as in the first embodiment, the sag amount on the second surface between the optical functional portions $5b2c$ and $5b2k$ of the second imaging lens $5b2$ decreases to 0 as the image height goes from the axial image height to the outermost off-axis image height, and then the sign is inverted. As a result, the spline curve part 152sp can be reduced. This can be seen from comparison with the mirror surface piece 60 in the conventional example shown in FIG. 6.

Figure 18:
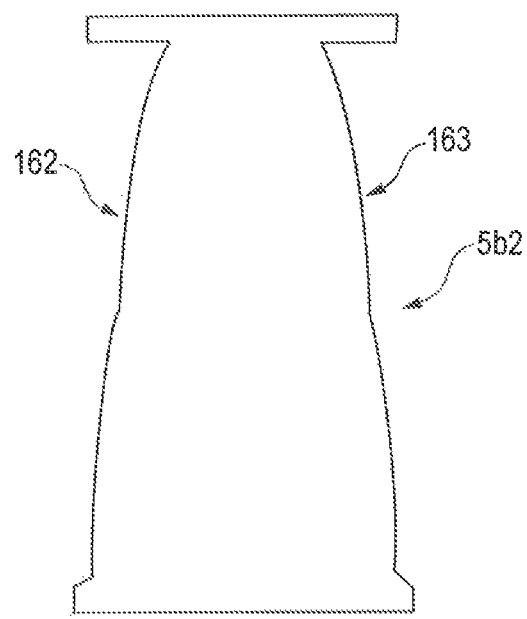
FIG. 18 is a diagram showing the second imaging lens 5b2 according to the second embodiment molded with the molding die 150.

FIG. 18 shows the second imaging lens $5b2$ according to this embodiment molded with the molding die 150. The second imaging lens $5b2$ has a first surface 162 and a second surface 163. As can be seen from FIG. 18, on the second surface 163 of the second imaging lens $5b2$ according to this embodiment, the upper and lower optical functional portions are smoothly connected to each other by the spline curve surface.

Although an embodiment in which the second surfaces of the upper and lower optical functional portions of the second imaging lens $5b2$ are smoothly connected by a spline curve surface has been described above, the first surfaces of the upper and lower optical functional portions can also be smoothly connected by a spline curve surface.

Figure 19:
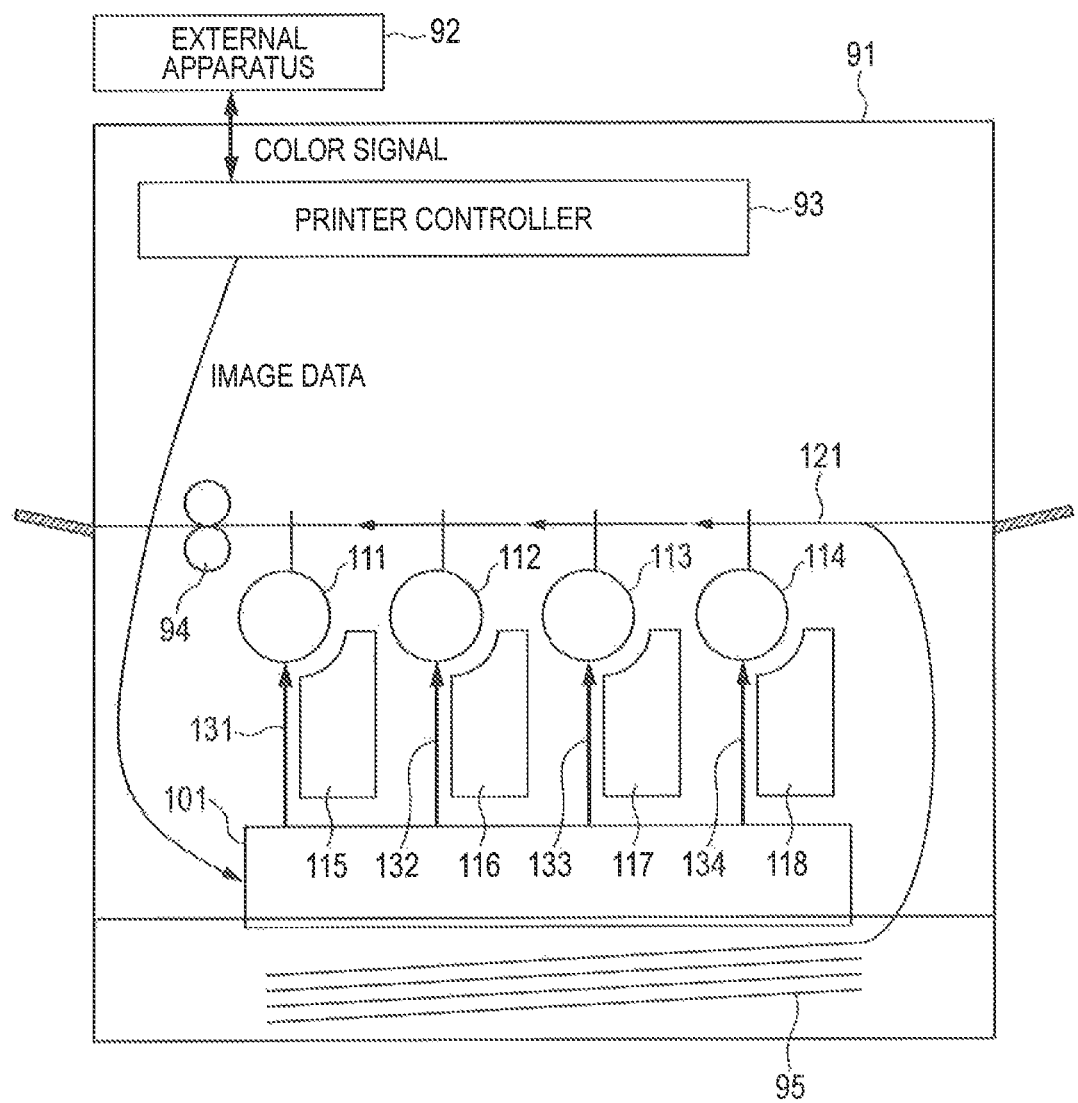
FIG. 19 is a schematic diagram showing essential parts of a color image forming apparatus 91 that incorporates the optical scanning apparatus according to the present invention.

FIG. 19 is a schematic diagram showing essential parts of a color image forming apparatus 91 that incorporates the optical scanning apparatus according to the present invention. The color image forming apparatus according to the present invention is of a tandem type that comprises an array of a plurality of optical scanning apparatuses that records image information on photosensitive drum surfaces, which are image carriers, in parallel.

The color image forming apparatus 91 comprises an optical scanning apparatus 101 according to one of the first and second embodiments of the present invention and photosensitive drums (photosensitive bodies) 111, 112, 113 and 114 serving as image carriers. The color image forming apparatus 91 further comprises development units 115, 116, 117 and 118, a conveyor belt 121, a fixing unit 94 and a paper cassette 95.

The color image forming apparatus 91 receives R (red), G (green) and B (blue) color signals (code data) from an external apparatus 92, such as a personal computer. A printer controller 93 in the apparatus converts these color signals into C (cyan), M (magenta), Y (yellow) and K (black) image data (image signals). The image data is input to the optical scanning apparatus 101. The optical scanning apparatus 101 emits light beams 131, 132, 133 and 134 modulated based on the image data, and photosensitive surfaces of the photosensitive drums 111, 112, 113 and 114 are scanned with the light beams in the main scanning direction.

The photosensitive drums 111 to 114 are rotated by a motor (not shown). As the photosensitive drums rotate, the photosensitive surfaces of the photosensitive drums 111 to 114 move in the sub-scanning direction perpendicular to the main scanning direction with respect to the light beams 131 to 134.

A charging roller (not shown) that uniformly charges the surfaces of the photosensitive drums 111 to 114 is provided under and abuts against the photosensitive drums 111 to 114. The surfaces of the photosensitive drums 111 to 114 charged by the charging roller are irradiated with the light beams 131 to 134 emitted from the optical scanning apparatus 101.

As described above, the light beams 131 to 134 are modulated based on the image data, and electrostatic latent images are formed on the surfaces of the photosensitive drums 111 to 114, that is, the photosensitive surfaces, that are irradiated with the light beams 131 to 134. The electrostatic latent images are developed as toner images by the development units 115 to 118 disposed to abut against the photosensitive drums 111 to 114 on further downstream in the direction of rotation of the photosensitive drums 111 to 114 than the parts of the photosensitive drums 111 to 114 irradiated with the light beams 131 to 134.

The toner images formed by the development units 115 to 118 are sequentially transferred onto a sheet of paper (not shown), which is a transferred material, by a transfer roller (transfer unit) (not shown) disposed upstream of the photosensitive drums 111 to 114 so as to face the photosensitive drums 111 to 114. The sheet of paper is stored in the paper cassette 95 in front of (below, in FIG. 19) the photosensitive drums 111 to 114. Alternatively, the sheet of paper may be manually fed. A feed roller (not shown) is disposed at an end of the paper cassette 95. The feed roller feeds the sheet of paper in the paper cassette 95 onto the conveyor belt 121, and the conveyor belt 121 conveys the sheet of paper to the photosensitive drums 111 to 114.

The sheet of paper on which yet-to-be-fixed toner images are transferred is conveyed to the fixing unit 94 disposed to the rear (left, in FIG. 19) of the photosensitive drums 111 to 114. The fixing unit 94 comprises a fixing roller that incorporates a fixing heater (not shown) and a pressure roller disposed to press against the fixing roller. The fixing unit 94 fixes the yet-to-be-fixed toner images on the sheet of paper by heating and pressing the conveyed sheet of paper between the fixing roller and the pressure roller. An paper ejecting roller (not shown) is disposed to the rear of the fixing unit 94. The paper ejecting roller ejects the sheet of paper on which the toner images are fixed to the outside of the image forming apparatus 91.

The printer controller 93 not only perform the data conversion described above but also controls the motor that drives the photosensitive drums 111 to 114, the components of the image forming apparatus 91, a polygon motor in the optical scanning apparatus 101 and the like.

The external apparatus 92 may be a color image reading apparatus provided with a CCD sensor, for example. In that case, the color image reading apparatus and the color image forming apparatus 91 form a color digital copying machine.

According to the present invention, an inexpensive and compact optical scanning apparatus can be provided that can reduce the sag amount in the optical axis direction at the connecting portion between the optical functional portions and thus can provide an image of high quality without causing deterioration of the optical capabilities.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-105309, filed May 21, 2014, which is hereby incorporated by reference herein in its entirety.

What is claimed is:

1. An optical scanning apparatus, comprising:
   a deflection unit that deflects a plurality of light fluxes to optically scan a plurality of scanned surfaces in a main scanning direction;
   a plurality of incident optical systems that cause the plurality of light fluxes to enter the deflection unit at different incident angles in a sub-scanning cross section; and
   an imaging optical system that guides the plurality of light fluxes deflected by the deflection unit onto the plurality of scanned surfaces,
   wherein the imaging optical system has a first optical portion and a second optical portion connected to each other by a connecting portion in a sub-scanning direction,
   wherein in a first plane including the connecting portion, a first incident surface of the first optical portion and a second incident surface of the second optical portion overlap with each other on a first point,
   wherein in the first plane, in a first region on one side of the first point in the main scanning direction, the first incident surface is located closer to the deflection unit than the second incident surface in an optical axis direction, and
   wherein in the first plane, in a second region on another side of the first point in the main scanning direction, the second incident surface is located closer to the deflection unit than the first incident surface in the optical axis direction.

2. The optical scanning apparatus according to claim 1, wherein in the first plane, the first point divides an effective diameter in the main scanning direction of the first optical portion in a ratio of a to (10-a) (a is equal to or greater than 8).

3. The optical scanning apparatus according to claim 1, wherein, provided that a maximum distance in the optical axis direction between a first intersection line of the first plane and the first incident surface and a second intersection line of the first plane and the second incident surface is denoted by $\Delta\mathrm{sag}1$ (mm), a conditional formula $$0 \leq \Delta\mathrm{sag}1 \leq 0.2$$

is satisfied.

4. The optical scanning apparatus according to claim 1, wherein, provided that a center position between a height in the sub-scanning direction of an on-axis marginal ray incident on the first incident surface and a height in the sub-scanning direction of an outermost off-axis marginal ray incident on the second incident surface is denoted by $Z_0$ (mm), and a position in the sub-scanning direction of the connecting portion is denoted by $Z_1$ (mm), a conditional formula $$Z_0 - 0.5 \leq Z_1 \leq Z_0 + 0.5$$

is satisfied.

5. The optical scanning apparatus according to claim 1, wherein the plurality of incident optical systems includes at least two incident optical systems that cause light fluxes to enter the deflection unit at different angles in a main scanning cross section perpendicular to the sub-scanning direction.

6. The optical scanning apparatus according to claim 1, wherein the plurality of incident optical systems includes at least two incident optical systems that cause light fluxes to enter the deflection unit from a same side with respect to a main scanning cross section including an optical axis.

7. The optical scanning apparatus according to claim 1, wherein the light fluxes emitted from the plurality of incident optical systems are deflected and scanned by a same deflecting surface of the deflection unit.

8. An image forming apparatus, comprising:
- an optical scanning apparatus according to claim 1;
- a development unit that develops, as a toner image, an electrostatic latent image formed on each of the plurality of scanned surfaces by the optical scanning apparatus;
- a transfer unit that transfers the formed toner image onto a transferred material; and
- a fixing unit that fixes the transferred toner image on the transferred material.

9. The image forming apparatus according to claim 8, further comprising:
- a printer controller that converts code data input from an external apparatus into an image signal and inputs the image signal to the optical scanning apparatus.

10. The optical scanning apparatus according to claim 1, wherein the connecting portion is formed by curves which are continuous and whose derivatives are continuous.

11. An optical scanning apparatus, comprising:
- a deflection unit that deflects a plurality of light fluxes to optically scan a plurality of scanned surfaces in a main scanning direction;
- a plurality of incident optical systems that cause the plurality of light fluxes to enter the deflection unit at different incident angles in a sub-scanning cross section; and
- an imaging optical system that guides the plurality of light fluxes deflected by the deflection unit onto the plurality of scanned surfaces,
- wherein the imaging optical system has a first optical portion and a second optical portion connected to each other by a connecting portion in a sub-scanning direction,
- wherein in a first plane including the connecting portion, a first exit surface of the first optical portion and a second exit surface of the second optical portion overlap with each other on a second point,
- wherein in the first plane, in a third region on one side of the second point in the main scanning direction, the second exit surface is located closer to the deflection unit than the first exit surface in an optical axis direction, and
- wherein in the first plane, in a fourth region on another side of the second point in the main scanning direction, the first exit surface is located closer to the deflection unit than the second exit surface in the optical axis direction.

12. The optical scanning apparatus according to claim 11, wherein in the first plane, the second point divides an effective diameter in the main scanning direction of the first optical portion in a ratio of a to (10-a) (a is equal to or greater than 8).

13. The optical scanning apparatus according to claim 11, wherein, provided that a maximum distance in the optical axis direction between a third intersection line of the first plane and the first exit surface and a fourth intersection line of the first plane and the second exit surface is denoted by $\Delta sag2$ (mm), a conditional formula $$0 \leq \Delta sag2 \leq 0.2$$

is satisfied.

14. The optical scanning apparatus according to claim 11, wherein, provided that a center position between a height in the sub-scanning direction of an on-axis marginal ray emitted from the first exit surface and a height in the sub-scanning direction of an outermost off-axis marginal ray emitted from the second exit surface is denoted by $Z_0$ (mm), and a position in the sub-scanning direction of the connecting portion is denoted by $Z_1$ (mm), a conditional formula $$Z_0 - 0.5 \leq Z_1 \leq Z_0 + 0.5$$

is satisfied.

15. The optical scanning apparatus according to claim 11, wherein the plurality of incident optical systems includes at least two incident optical systems that cause light fluxes to enter the deflection unit at different angles in a main scanning cross section perpendicular to the sub-scanning direction.

16. The optical scanning apparatus according to claim 11, wherein the plurality of incident optical systems includes at least two incident optical systems that cause light fluxes to enter the deflection unit from a same side with respect to a main scanning cross section including an optical axis.

17. The optical scanning apparatus according to claim 11, wherein the light fluxes emitted from the plurality of incident optical systems are deflected and scanned by a same deflecting surface of the deflection unit.

18. The optical scanning apparatus according to claim 11, wherein the connecting portion is formed by curves which are continuous and whose derivatives are continuous.

19. An optical scanning apparatus, comprising:
- a deflection unit that deflects a plurality of light fluxes to optically scan a plurality of scanned surfaces in a main scanning direction;
- a plurality of incident optical systems that cause the plurality of light fluxes to enter the deflection unit at different incident angles in a sub-scanning cross section; and
- an imaging optical system that guides the plurality of light fluxes deflected by the deflection unit onto the plurality of scanned surfaces,
- wherein the imaging optical system has a first optical portion and a second optical portion connected to each other by a connecting portion in a sub-scanning direction,
- wherein in a first plane including the connecting portion, a first incident surface of the first optical portion and a second incident surface of the second optical portion overlap with each other on a first point,
- wherein in the first plane, in a first region on one side of the first point in the main scanning direction, the first incident surface is located closer to the deflection unit than the second incident surface in an optical axis direction,
- wherein in the first plane, in a second region on another side of the first point in the main scanning direction, the second incident surface is located closer to the deflection unit than the first incident surface in the optical axis direction,
- wherein in the first plane, a first exit surface of the first optical portion and a second exit surface of the second optical portion overlap with each other on a second point,
- wherein in the first plane, in a third region on one side of the second point in the main scanning direction, the second exit surface is located closer to the deflection unit than the first exit surface in an optical axis direction, and
- wherein in the first plane, in a fourth region on another side of the second point in the main scanning direction, the first exit surface is located closer to the deflection unit than the second exit surface in the optical axis direction.

20. The optical scanning apparatus according to claim 19, wherein the connecting portion is formed by curves which are continuous and whose derivatives are continuous.

* * * * *